(12) United States Patent
Chen et al.

(10) Patent No.: US 12,439,390 B2
(45) Date of Patent: *Oct. 7, 2025

(54) LATENCY REDUCTION TECHNIQUES IN WIRELESS COMMUNICATIONS

(71) Applicant: QUALCOMM Incorporated, San Diego, CA (US)

(72) Inventors: Wanshi Chen, San Diego, CA (US); Seyedkianoush Hosseini, San Diego, CA (US); Peter Gaal, San Diego, CA (US); Srinivas Yerramalli, San Diego, CA (US); Hao Xu, Beijing (CN); Jing Sun, San Diego, CA (US); Shimman Arvind Patel, San Diego, CA (US); Aamod Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/489,758

(22) Filed: Oct. 18, 2023

(65) Prior Publication Data

US 2024/0049198 A1 Feb. 8, 2024

Related U.S. Application Data

(63) Continuation of application No. 17/313,749, filed on May 6, 2021, now Pat. No. 11,825,454, which is a
(Continued)

(51) Int. Cl.
*H04W 72/0446* (2023.01)
*H04L 1/1812* (2023.01)
(Continued)

(52) U.S. Cl.
CPC ....... *H04W 72/0446* (2013.01); *H04L 1/1812* (2013.01); *H04L 1/1861* (2013.01);
(Continued)

(58) Field of Classification Search
CPC .......... H04W 72/0446; H04W 72/042; H04W 72/0413; H04W 88/02; H04W 5/0048;
(Continued)

(56) References Cited

U.S. PATENT DOCUMENTS 9,628,227 B2   4/2017  Aiba et al.
10,231,220 B2  3/2019  Hwang et al.
(Continued)

FOREIGN PATENT DOCUMENTS

CN   105340349 A    2/2016
JP   2013236289 A   11/2013
(Continued)

OTHER PUBLICATIONS

Kyocera: "SRS Design for eLAA", 3GPP TSG RAN WG1 Meeting #85, R1-164719, Nanjing, China, May 23, 2016-May 27, 2016, 3 Pages, May 27, 2016.
(Continued)

*Primary Examiner* — Warner Wong
(74) *Attorney, Agent, or Firm* — Holland & Hart LLP

(57) ABSTRACT

Methods, systems, and devices for wireless communication are described that provide for reduced timing between certain downlink communications and responsive uplink communications relative to certain legacy systems (e.g., legacy LTE systems). A user equipment (UE) or base station may be capable of operating using two or more timing configurations that each include an associated time period between receipt of a downlink communication (e.g., a grant of uplink resources or shared channel data) and a responsive uplink communication (e.g., an uplink transmission using
(Continued)

the granted uplink resources or feedback of successful reception of the shared channel data). In cases where a UE or base station are capable of two or more timing configurations, a timing configuration for a transmission may be determined and the responsive uplink communication transmitted according to the determined timing configuration.

52 Claims, 16 Drawing Sheets

Related U.S. Application Data continuation of application No. 16/390,329, filed on Apr. 22, 2019, now Pat. No. 11,006,409, which is a continuation of application No. 15/642,104, filed on Jul. 5, 2017, now Pat. No. 10,314,037.

(60) Provisional application No. 62/368,716, filed on Jul. 29, 2016, provisional application No. 62/360,194, filed on Jul. 8, 2016.

(51) Int. Cl.
| | | |
|---|---|---|
| *H04L 1/1829* | (2023.01) | |
| *H04L 1/1867* | (2023.01) | |
| *H04L 5/00* | (2006.01) | |
| *H04W 72/21* | (2023.01) | |
| *H04W 72/23* | (2023.01) | |
| *H04W 76/27* | (2018.01) | |
| *H04W 88/02* | (2009.01) | |

(52) U.S. Cl.
CPC .............. *H04L 1/1896* (2013.01); *H04L 5/00* (2013.01); *H04L 5/0048* (2013.01); *H04W 72/21* (2023.01); *H04W 72/23* (2023.01); *H04W 76/27* (2018.02); *H04W 88/02* (2013.01)

(58) Field of Classification Search
CPC . H04L 1/1812; H04L 5/0048; H04L 12/6418; H04L 2012/0497; H04L 2025/03745
See application file for complete search history.

(56) References Cited

U.S. PATENT DOCUMENTS

| | | | |
|---|---|---|---|
| 10,314,037 | B2 | 6/2019 | Chen et al. |
| 10,397,915 | B2 | 8/2019 | Hosseini et al. |
| 11,006,409 | B2 | 5/2021 | Chen et al. |
| 2009/0213817 | A1 | 8/2009 | Park et al. |
| 2011/0128931 | A1 | 6/2011 | Ishii et al. |
| 2011/0134774 | A1 | 6/2011 | Pelletier et al. |
| 2012/0076040 | A1* | 3/2012 | Hoshino ............... H04L 1/0027 370/252 |
| 2013/0053078 | A1 | 2/2013 | Barbieri et al. |
| 2013/0121280 | A1 | 5/2013 | Ouchi et al. |
| 2013/0182674 | A1 | 7/2013 | Lunttila et al. |
| 2013/0250925 | A1 | 9/2013 | Lohr et al. |
| 2013/0272261 | A1 | 10/2013 | Seo et al. |
| 2014/0011468 | A1 | 1/2014 | Park et al. |
| 2014/0036859 | A1 | 2/2014 | Ekpenyong et al. |
| 2014/0105164 | A1 | 4/2014 | Moulsley et al. |
| 2014/0233542 | A1 | 8/2014 | Bergström et al. |
| 2014/0328327 | A1 | 11/2014 | Xiao et al. |
| 2014/0348100 | A1 | 11/2014 | Ratasuk et al. |
| 2015/0043488 | A1 | 2/2015 | Hakola et al. |
| 2015/0131536 | A1 | 5/2015 | Kaur et al. |
| 2015/0215091 | A1 | 7/2015 | Lee et al. |
| 2015/0223235 | A1 | 8/2015 | Hwang et al. |
| 2015/0230194 | A1 | 8/2015 | Yang et al. |
| 2015/0271755 | A1 | 9/2015 | Karri et al. |
| 2015/0271837 | A1 | 9/2015 | Larsson et al. |
| 2015/0365965 | A1 | 12/2015 | Wu et al. |
| 2016/0014802 | A1 | 1/2016 | Yang et al. |
| 2016/0057806 | A1 | 2/2016 | Wittberg et al. |
| 2016/0134458 | A1 | 5/2016 | Xia et al. |
| 2016/0150453 | A1 | 5/2016 | Narayanan et al. |
| 2016/0234836 | A1 | 8/2016 | Aiba et al. |
| 2016/0255649 | A1 | 9/2016 | Kusashima et al. |
| 2016/0338022 | A1 | 11/2016 | Choi et al. |
| 2016/0338048 | A1 | 11/2016 | Aiba et al. |
| 2016/0338096 | A1 | 11/2016 | Vajapeyam et al. |
| 2016/0345206 | A1 | 11/2016 | Yerramalli et al. |
| 2016/0381589 | A1 | 12/2016 | Zhang et al. |
| 2016/0381681 | A1 | 12/2016 | Nogami et al. |
| 2017/0005770 | A1 | 1/2017 | Shimezawa et al. |
| 2017/0041805 | A1 | 2/2017 | Chandrasekhar et al. |
| 2017/0086171 | A1 | 3/2017 | Fliess |
| 2017/0086207 | A1 | 3/2017 | Yokomakura et al. |
| 2017/0118745 | A1 | 4/2017 | Nogami et al. |
| 2017/0230928 | A1 | 8/2017 | Basu Mallick et al. |
| 2017/0257884 | A1 | 9/2017 | Rahman et al. |
| 2017/0302419 | A1 | 10/2017 | Liu et al. |
| 2018/0014301 | A1 | 1/2018 | Chen et al. |
| 2018/0027581 | A1 | 1/2018 | Khoryaev et al. |
| 2018/0049046 | A1 | 2/2018 | Lunttila et al. |
| 2018/0124611 | A1 | 5/2018 | Moon et al. |
| 2018/0139731 | A1 | 5/2018 | Suzuki et al. |
| 2018/0219599 | A1 | 8/2018 | Lee et al. |
| 2018/0302916 | A1 | 10/2018 | Lee et al. |
| 2018/0331792 | A1 | 11/2018 | Yang et al. |
| 2018/0343047 | A1 | 11/2018 | He et al. |
| 2018/0367262 | A1 | 12/2018 | Hwang et al. |
| 2019/0098611 | A1* | 3/2019 | Shimezawa ........... H04W 72/23 |
| 2019/0109732 | A1* | 4/2019 | Choi ..................... H04L 5/0051 |
| 2019/0182833 | A1* | 6/2019 | Li .......................... H04L 1/1854 |
| 2019/0246398 | A1 | 8/2019 | Chen et al. |
| 2019/0342769 | A1 | 11/2019 | Li et al. |
| 2020/0015266 | A1 | 1/2020 | Yan et al. |
| 2020/0037280 | A1* | 1/2020 | Enbuske ............... H04W 72/23 |
| 2020/0236635 | A1 | 7/2020 | Yan et al. |
| 2020/0329459 | A1 | 10/2020 | Iwai et al. |
| 2021/0282138 | A1 | 9/2021 | Chen et al. |

FOREIGN PATENT DOCUMENTS

| | | | |
|---|---|---|---|
| WO | 2014209049 | A1 | 12/2014 |
| WO | 2015043427 | A1 | 4/2015 |
| WO | 2015167182 | A1 | 11/2015 |
| WO | 2016053844 | | 4/2016 |
| WO | 2017166195 | A1 | 10/2017 |
| WO | 2020029702 | A1 | 2/2020 |

OTHER PUBLICATIONS

Ericsson: "Multi-Subframe Scheduling Design for Enhanced LAA [online]", 3GPP TSG-RAN WG1#84b, R1-163140, http://www.3gpp.org/ftp/tsg_ran/WG1_RL1/TSGR1_84b/Docs/R1-163140.zip, Apr. 15, 2016, 3 Pages.
Ericsson: "Proposal for CA 15+15MHz SDR Tests", 3GPP TSG-RAN WG4 Meeting #70, R4-140538_SDR_15MHZ_CA, 3rd Generation Partnership Project (3GPP), Mobile Competence Centre, 650, Route Des Lucioles, F-06921 Sophia-Antipolis Cedex, France, vol. RAN WG4, No. Prague, Feb. 11, 2014-Feb. 14, 2014, Feb. 9, 2014, pp. 1-3.
European Search Report—EP19197038—Search Authority—The Hague—Nov. 28, 2019 (164137EPD1).
Huawei., et al., "Discussion on CSI Feedback for Short TTI," 3GPP Draft; R1-164065, 3rd Generation Partnership Project (3GPP), Mobile Competence Centre; 650, Rouote Des Lucioles; F-06921 Sophia-Antipolis Cedex; France, vol. RAN WG1, No. Nanjing, China; May 23, 2016-May 27, 2016, May 14, 2016, XP051096619, 3 Pages, Retrieved from the Internet: URL: http://www.3gpp.org/ftp/tsg_ran/WG1_RL1/TSGR1_85/Docs/ [retrieved on May 14, 2016] *paragraph [03.1]*.
Huawei, et al., "Short TTI for DL Transmissions", 3GPP TSG RAN WG1 Meeting #84, R1-160292, 3rd Generation Partnership Project, Mobile Competence Centre, 650, Route Des Lucioles, F-06921

(56) References Cited

OTHER PUBLICATIONS

Sophia-Antipolis Cedex, France, vol. RAN WG1, No. St Julian's, Malta, Feb. 15, 2016-Feb. 19, 2016, Feb. 6, 2016, XP051064110, 7 Pages.

Huawei., et al., "New Maximum TBS Design for DMRS-Based Transmission Modes", 3GPP TSG RAN WG1 Meeting #82bis, R1-155073, 3rd Generation Partnership Project (3GPP), Mobile Competence Centre, 650, Route Des Lucioles, F-06921 Sophia-Antipolis Cedex, France, vol. RAN WG1, No. Malmo, Sweden, Oct. 5, 2015-Oct. 9, 2015, Oct. 4, 2015, 3 Pages.

Huawei., et al., "On Support of Larger Max TBS for TDD UL for eMTC", 3GPP TSG-RAN Meeting #71, RP-160306, 3rd Generation Partnership Project (3GPP), Mobile Competence Centre, 650, Route Des Lucioles, F-06921 Sophia-Antipolis Cedex, France,, vol. TSG RAN, No. Göteborg, Mar. 7, 2016-Mar. 1, 2016, Mar. 6, 2016, 4 Pages.

Intel Corporation: "Latency Reduction Between UL Grant and PUSCH", 3GPP Draft, 3GPP TSG RAN WG1 Meeting #84, R1-160426, 3rd Generation Partnership Project (3GPP), Mobile Competence Centre, 650, Route Des Lucioles, F-06921 Sophia-Antipolis Cedex, France, vol. RAN WG1, No. St. Julian's, Malta, Feb. 14, 2016, 3 Pages, Feb. 15, 2016-feb. 19, 2016, XP051053763.

Intel Corporation: "On the UL Scheduling Starvation Issue", R1-160425, 3GPP TSG RAN WG1 Meeting #84, St. Julian's, Malta, Feb. 15-19, 2016, 3 Pages.

International Preliminary Report on Patentability—PCT/US2017/040807, The International Bureau of WIPO—Geneva, Switzerland, Jan. 17, 2019 (164137WO).

International Search Report and Written Opinion—PCT/US2017/040807—ISA/EPO—Nov. 27, 2017 (164137WO).

ISA/EPO, Partial International Search Report of the International Searching Authority, Int'l. App. No. PCT/US2017/040807, Oct. 4, 2017, European Patent Office, Rijswijk, NL, 21 pgs.

Lenovo: "Considerations on TTI Shortening for UL", 3GPP TSG RAN WG1 Meeting #84, R1-161018, 3rd Generation Partnership Project (3GPP), Mobile Competence Centre, 650, Route Des Lucioles, F-06921 Sophia-Antipolis Cedex, France, vol. RAN WG1, No. St Julian's, Malta, Feb. 15, 2016-Feb. 19, 2016, Feb. 14, 2016, 2 Pages.

Taiwan Search Report—TW106122660—TIPO—Aug. 19, 2019 (164137TW).

European Search Report—EP24201841—Search Authority—The Hague—Dec. 17, 2024.

Huawei: "SRS Carrier based Switching for LTE", 3GPP TSG RAN meeting #72, RP-161332, 3rd Generation Partnership Project, Mobile Competence Centre, 650, Route Des Lucioles, F-06921, Sophia-Antipolis Cedex, FRANCE, vol. TSG RAN, No. Busan, Korea, Jun. 13, 2016-Jun. 16, 2016, Jun. 16, 2016, 8 Pages, XP051660653, p. 4-p. 6.

CMCC: "Discussion on Latency Reduction for TDD", 3GPP TSG RAN WG1 Meeting #85, R1-164885, Nanjing, China May 23-27, 2016, May 13, 2016, pp. 1-3.

Huawei, et al., "Processing Time Reduction for Short TTI", 3GPP TSG RAN WG1 Meeting #85, R1-164067, Nanjing, China, May 23-27, 2016, May 14, 2016, 3 Pages.

LG Electronics: "Processing Time Reduction for Latency Reduction", 3GPP TSG RAN WG1 Meeting #85, R1-165429, Nanjing, China May 23-27, 2016, May 20, 2016, 7 Pages.

* cited by examiner

LATENCY REDUCTION TECHNIQUES IN WIRELESS COMMUNICATIONS

CROSS REFERENCES

The present Application for Patent is a Continuation of U.S. patent application Ser. No. 17/313,749 by Chen et al., entitled, "LATENCY REDUCTION TECHNIQUES IN WIRELESS COMMUNICATIONS" filed May 6, 2021, which is a Continuation of U.S. patent application Ser. No. 16/390,329 by Chen et al., now U.S. Pat. No. 11,006,409, entitled "LATENCY REDUCTION TECHNIQUES IN WIRELESS COMMUNICATIONS" filed Apr. 22, 2019, which is a Continuation of U.S. patent application Ser. No. 15/642,104 by Chen, et al., now U.S. Pat. No. 10,314,037, entitled "LATENCY REDUCTION TECHNIQUES IN WIRELESS COMMUNICATIONS" filed Jul. 5, 2017, which claims the benefit of U.S. Provisional Patent Application No. 62/360,194, entitled "LATENCY REDUCTION TECHNIQUES IN WIRELESS COMMUNICATIONS," filed Jul. 8, 2016, and to U.S. Provisional Patent Application No. 62/368,716, entitled, "LATENCY REDUCTION TECHNIQUES IN WIRELESS COMMUNICATIONS," filed Jul. 29, 2016, each of which is assigned to the assignee hereof and herein incorporated by reference in their entireties.

BACKGROUND

The following relates generally to wireless communication and more specifically to latency reduction techniques in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

In some instances, transmission errors between mobile devices and base stations are avoided and/or corrected by utilizing an automatic repeat request (ARQ) scheme. An ARQ scheme may be employed to detect whether a received packet is in error. For example, in an ARQ scheme, a receiver may notify a transmitter with a positive acknowledgment (ACK), when a packet is received free from errors; and the receiver may notify the transmitter with a negative acknowledgment (NACK), if an error is detected. A hybrid ARQ (HARQ) scheme may be used to correct some errors and to detect and discard certain uncorrectable packets. In some scenarios, however, the overall HARQ delay may cause certain inefficiencies in wireless communications.

Furthermore, in some cases uplink resources may be allocated to a UE in downlink control information that is transmitted in a downlink transmission from a base station to the UE. The UE may receive the downlink control information, decode the allocated uplink resources, and begin transmitting the associated uplink transmission following a certain time period from a transmission containing the downlink control information. The delay from the reception of the downlink allocation to a start of uplink transmissions may also cause certain inefficiencies in wireless communications.

SUMMARY

The described techniques relate to improved methods, systems, devices, or apparatuses that support latency reduction techniques in wireless communications. Generally, the described techniques provide for reduced timing between certain downlink communications and responsive uplink communications relative to certain legacy systems (e.g., legacy LTE systems). In some examples, a user equipment (UE) or base station may be capable of operating using two or more timing configurations that each include an associated time period between receipt of a downlink communication (e.g., a grant of uplink resources or shared channel data) and a responsive uplink communication (e.g., an uplink transmission using the granted uplink resources or feedback of successful reception of the shared channel data). In cases where a UE or base station are capable of two or more timing configurations, a timing configuration for a transmission may be determined and the responsive uplink communication transmitted according to the determined timing configuration. In cases where a reduced time period is used for transmissions, latency of the system may be reduced and the efficiency of the system enhanced.

A method of wireless communication is described. The method may include determining whether to use a first timing configuration or a second timing configuration transmissions, the first timing configuration including a first time difference between a downlink communication and a responsive uplink communication, and the second timing configuration including a second time difference between the downlink communication and the responsive uplink communication, the second time difference being less than the first time difference, and wherein the determination may be based on a capability of a user equipment (UE) to transmit the responsive uplink communication within the first time difference or the second time difference, and transmitting according to the first timing configuration or the second timing configuration based on the determination.

An apparatus for wireless communication is described. The apparatus may include means for determining whether to use a first timing configuration or a second timing configuration transmissions, the first timing configuration including a first time difference between a downlink communication and a responsive uplink communication, and the second timing configuration including a second time difference between the downlink communication and the responsive uplink communication, the second time difference being less than the first time difference, and wherein the determination may be based on a capability of a UE to transmit the responsive uplink communication within the first time difference or the second time difference, and means for transmitting according to the first timing configuration or the second timing configuration based on the determination.

Another apparatus for wireless communication is described. The apparatus may include a processor, memory in electronic communication with the processor, and instructions stored in the memory. The instructions may be operable, when executed by the processor, to cause the apparatus to determine whether to use a first timing configuration or a second timing configuration transmissions, the first timing configuration including a first time difference between a downlink communication and a responsive uplink communication, and the second timing configuration including a second time difference between the downlink communication and the responsive uplink communication, the second time difference being less than the first time difference, and wherein the determination may be based on a capability of a UE to transmit the responsive uplink communication within the first time difference or the second time difference, and transmit according to the first timing configuration or the second timing configuration based on the determination.

A non-transitory computer readable medium for wireless communication is described. The non-transitory computer-readable medium may include instructions operable to cause a processor to determine whether to use a first timing configuration or a second timing configuration transmissions, the first timing configuration including a first time difference between a downlink communication and a responsive uplink communication, and the second timing configuration including a second time difference between the downlink communication and the responsive uplink communication, the second time difference being less than the first time difference, and wherein the determination may be based on a capability of a UE to transmit the responsive uplink communication within the first time difference or the second time difference, and transmit according to the first timing configuration or the second timing configuration based on the determination.

In some examples of the method, apparatus, and non-transitory computer-readable medium described above, the downlink communication contains an uplink grant and the responsive uplink communication uses resources identified in the uplink grant. In some examples of the method, apparatus, and non-transitory computer-readable medium described above, the downlink communication includes downlink data and the responsive uplink communication provides acknowledgment feedback of successful reception of the downlink data. In some examples of the method, apparatus, and non-transitory computer-readable medium described above, the determination may be further based on a capability of a base station to operate according to the first time difference or the second time difference.

Some examples of the method, apparatus, and non-transitory computer-readable medium described above may further include processes, features, means, or instructions for receiving downlink control information (DCI) for the downlink communication in a common search space of a downlink control channel, and transmitting according to the first timing configuration or the second timing configuration may include transmitting according to the first timing configuration responsive to receiving the DCI for the downlink communication in the common search space.

Some examples of the method, apparatus, and non-transitory computer-readable medium described above may further include processes, features, means, or instructions for receiving DCI for the downlink communication in a UE-specific search space of a downlink control channel, and transmitting according to the first timing configuration or the second timing configuration comprises transmitting according to the second timing configuration responsive to receiving the DCI for the downlink communication in the UE-specific search space.

Some examples of the method, apparatus, and non-transitory computer-readable medium described above may further include processes, features, means, or instructions for receiving DCI for the downlink communication, and transmitting according to the first timing configuration or the second timing configuration may be further based on a format of the DCI. In some examples of the method, apparatus, and non-transitory computer-readable medium described above, the transmitting includes transmitting according to the first timing configuration for a first subset of a set of available DCI formats, and transmitting according to the second timing configuration for a second subset of the set of available DCI formats.

In some examples of the method, apparatus, and non-transitory computer-readable medium described above, the transmitting includes determining that the downlink communication includes one or more of a system information block (SIB) transmission, a random access transmission, or a broadcast transmission transmitted to multiple receivers, and transmitting according to the first timing configuration responsive to the determining. In some examples of the method, apparatus, and non-transitory computer-readable medium described above, determining the second timing configuration includes identifying a maximum timing advance (TA) available for the responsive uplink communication, and determining the second timing configuration based on the maximum TA.

In some examples of the method, apparatus, and non-transitory computer-readable medium described above, determining the second timing configuration may further include processes, features, means, or instructions for identifying a maximum transport block size (TBS) available for the responsive uplink communication, and determining the second timing configuration based on the maximum TA and the maximum TBS.

Some examples of the method, apparatus, and non-transitory computer-readable medium described above may further include processes, features, means, or instructions for receiving control information associated with the downlink communication in a control channel that spans an entire subframe, and determining the first timing configuration for the responsive uplink communication based on the receiving. Some examples of the method, apparatus, and non-transitory computer-readable medium described above may further include processes, features, means, or instructions for receiving control information associated with the downlink communication in a control channel that spans a subset of symbols of a subframe, and determining the second timing configuration for the responsive uplink communication based on the receiving.

Some examples of the method, apparatus, and non-transitory computer-readable medium described above may further include processes, features, means, or instructions for transmitting, by the UE, an indication of the capability of the UE to transmit the responsive uplink communication within the first time difference or the second time difference. Some examples of the method, apparatus, and non-transitory computer-readable medium described above may further include processes, features, means, or instructions for receiving, from the UE, an indication of the capability of the UE to transmit the responsive uplink communication within the first time difference or the second time difference.

In some examples of the method, apparatus, and non-transitory computer-readable medium described above, a maximum TBS available for the second timing configuration is determined based on an indication of the capability of the UE to transmit the responsive uplink communication within the first time difference or the second time difference. In some examples of the method, apparatus, and non-transitory computer-readable medium described above, a maximum TBS available for the second timing configuration may be determined based on a number of concurrent transmissions that may be received by the UE.

Some examples of the method, apparatus, and non-transitory computer-readable medium described above may further include processes, features, means, or instructions for determining a third timing configuration that includes a third time difference between an uplink communication and a responsive downlink communication, where the third time difference may be less than the first time difference. Some examples of the method, apparatus, and non-transitory computer-readable medium described above may further include processes, features, means, or instructions for determining a third timing configuration that includes a third time difference between the downlink communication and the responsive uplink communication, where the third time difference may be less than the first time difference. In some examples of the method, apparatus, and non-transitory computer-readable medium described above, the third time difference may be less than or equal to the second time difference.

In some examples of the method, apparatus, and non-transitory computer-readable medium described above, the downlink communication includes an uplink grant that may be provided no earlier than a latest subframe associated with acknowledgment receipt feedback to be transmitted using wireless resources identified in the uplink grant. In some examples of the method, apparatus, and non-transitory computer-readable medium described above, the downlink communication includes an uplink grant and the responsive uplink communication includes an uplink data message, and where the method, apparatus, and non-transitory computer-readable medium may further include processes, features, means, or instructions for determining that the first time difference or the second time difference jointly applies to another downlink communication and another responsive uplink communication based on the determination whether to use the first timing configuration or the second timing configuration, where the other downlink communication includes a downlink grant and the other responsive uplink communication includes feedback responsive to the downlink grant.

Some examples of the method, apparatus, and non-transitory computer-readable medium described above may further include processes, features, means, or instructions for receiving radio resource control (RRC) signaling that indicates the first timing configuration or the second timing configuration, and determining the first timing configuration or the second timing configuration for each of a plurality of transmission time intervals (TTIs) based on the RRC signaling. Some examples of the method, apparatus, and non-transitory computer-readable medium described above may further include processes, features, means, or instructions for dynamically determining the first timing configuration or the second timing configuration for each of a plurality of transmission time intervals (TTIs). In some examples of the method, apparatus, and non-transitory computer-readable medium described above, the dynamically determining is based on one or more scheduling parameters associated with the downlink communication.

In some examples of the method, apparatus, and non-transitory computer-readable medium described above, the downlink communication may be a physical downlink shared channel (PDSCH) transmission, and the responsive uplink communication may be a transmission of an asynchronous hybrid automatic repeat request (HARQ) feedback associated with the PDSCH transmission. In some examples of the method, apparatus, and non-transitory computer-readable medium described above, a first number of HARQ processes associated with the first timing configuration may be greater than a second number of HARQ processes associated with the second timing configuration.

Some examples of the method, apparatus, and non-transitory computer-readable medium described above may further include processes, features, means, or instructions for determining whether the first timing configuration or the second timing configuration applies for asynchronous uplink HARQ feedback based on determining whether to use the first timing configuration or the second timing configuration for transmissions. In some examples of the method, apparatus, and non-transitory computer-readable medium described above, a number of HARQ processes for the asynchronous HARQ feedback may be eight. Some examples of the method, apparatus, and non-transitory computer-readable medium described above may further include processes, features, means, or instructions for determining whether to use a synchronous or asynchronous uplink HARQ feedback scheme based on whether the downlink communication includes a downlink grant in a common search space or a UE-specific search space.

Some examples of the method, apparatus, and non-transitory computer-readable medium described above may further include processes, features, means, or instructions for identifying a location of control channel resources for the responsive uplink communication in a downlink control channel transmission based on the second timing configuration where a first UE-specific offset may be associated with the first timing configuration and a second UE-specific offset may be associated with the second timing configuration. In some examples of the method, apparatus, and non-transitory computer-readable medium described above, determining the second timing configuration may further include processes, features, means, or instructions for identifying a periodicity for updating channel state information (CSI) based on the second timing configuration.

In some examples of the method, apparatus, and non-transitory computer-readable medium described above, identifying the periodicity for updating CSI includes identifying one or more of a number of CSI processes, a CSI report type, or a reference measurement subframe. In some examples of the method, apparatus, and non-transitory computer-readable medium described above, determining the second timing configuration may further include processes, features, means, or instructions for determining aperiodic CSI configuration based on a number of CSI processes supported for the second timing configuration. In some examples of the method, apparatus, and non-transitory computer-readable medium described above, determining the second timing configuration may further include processes, features, means, or instructions for identifying a sounding reference signal (SRS) parameter based on the second timing configuration. In some examples of the method, apparatus, and non-transitory computer-readable medium described above, the SRS parameter configures aperiodic SRS transmission based the second timing configuration. Some examples of the method, apparatus, and non-transitory computer-readable medium described above may further include processes, features, means, or instructions for receiving downlink control information (DCI) for the downlink communication, and configuring different timing for SRS transmission and physical uplink shared channel (PUSCH) transmission under the DCI.

In some examples of the method, apparatus, and non-transitory computer-readable medium described above, the downlink communication may be transmitted using a set of component carriers, determining the first timing configuration includes determining the first timing configuration for a first subset of the set of component carriers, and determining the second timing configuration includes determining the second timing configuration for a second subset of the set of component carriers.

Some examples of the method, apparatus, and non-transitory computer-readable medium described above may further include processes, features, means, or instructions for determining whether each of the first subset of component carriers and the second subset of component carriers support the second timing configuration, transmitting using the second timing configuration for one or more of the first subset of component carriers or the second subset of component carriers when each of the first subset of component carriers and the second subset of component carriers support the second timing configuration, and transmitting using the first timing configuration for each component carrier when one or more of the first subset of component carriers or the second subset of component carriers supports only the first timing configuration.

In some examples of the method, apparatus, and non-transitory computer-readable medium described above, downlink scheduling information for the second timing configuration may be supported in a physical downlink control channel (PDCCH) transmission and may not be supported in an enhanced physical downlink control channel (ePDCCH) transmission. In some examples of the method, apparatus, and non-transitory computer-readable medium described above, downlink scheduling information for the second timing configuration may be supported in both a PDCCH transmission and an ePDCCH transmission, and available transport block sizes (TBSs) of the downlink scheduling information in the ePDCCH transmission may be different than available TBSs in the PDCCH transmission.

In some examples of the method, apparatus, and non-transitory computer-readable medium described above, the transmitting using the second timing configuration includes transmitting using the second timing configuration for the second subset of component carriers and transmitting using the first timing configuration for the first subset of component carriers, and the method, apparatus, and non-transitory computer-readable medium may further include processes, features, means, or instructions for determining that uplink control information associated with the first subset of component carriers and the second subset of component carriers is to be transmitted using a same uplink subframe, and transmitting the uplink control information in parallel uplink control channel transmissions, multiplexing the uplink control information over a same uplink control channel resource, or dropping uplink control information for one of the first subset of component carriers or second subset of component carriers.

Some examples of the method, apparatus, and non-transitory computer-readable medium described above may further include processes, features, means, or instructions for configuring one or more of CSI reporting or HARQ feedback for the first subset of the set of component carriers based on the first timing configuration, and configuring one or more of CSI reporting or HARQ feedback for the second subset of the set of component carriers based on the second timing configuration.

Some examples of the method, apparatus, and non-transitory computer-readable medium described above may further include processes, features, means, or instructions for configuring a plurality of HARQ processes, and where HARQ feedback for the first subset of the set of component carriers may be multiplexed with HARQ feedback for the second subset of the set of component carriers, HARQ feedback for the first subset of the set of component carriers may be transmitted using first physical uplink control channel (PUCCH) resources and HARQ feedback for the second subset of the set of component carriers may be transmitted using second PUCCH resources, and transmitting HARQ feedback for the first subset of the set of component carriers or the second subset of the set of component carriers, or both, where transmitting HARQ feedback for both the first subset and the second subset may be indicative of an error case.

In some examples of the method, apparatus, and non-transitory computer-readable medium described above, the downlink communication and the responsive uplink communication may be transmitted using a time division duplexing (TDD) frame structure, and the method, apparatus, and non-transitory computer-readable medium may further include processes, features, means, or instructions for identifying an uplink subframe for HARQ feedback for the first subset or the second subset of the set of component carriers, determining that a downlink subframe for at least one component carrier of the set coincides with the uplink subframe identified for HARQ feedback, and transmitting the HARQ feedback during the uplink subframe without monitoring for a downlink control message for the at least one component carrier during the downlink subframe.

Some examples of the method, apparatus, and non-transitory computer-readable medium described above may further include processes, features, means, or instructions for configuring an uplink control channel resource indicator based on the first timing configuration for a downlink communication TTI, determining that a second TTI may use the second timing configuration, and updating the uplink control channel resource indicator based on the second timing configuration for the second TTI.

Some examples of the method, apparatus, and non-transitory computer-readable medium described above may further include processes, features, means, or instructions for determining that a transmission in a first TTI may be dependent upon information in a second TTI subsequent to the first TTI, and modifying the second timing configuration to increase the second time difference based on the determining.

In some examples of the method, apparatus, and non-transitory computer-readable medium described above, the downlink communication and the responsive uplink communication may be time division duplexing (TDD) communications, and the method, apparatus, and non-transitory computer-readable medium may further include processes, features, means, or instructions for determining that a first TDD downlink subframe has the first timing configuration, determining that a second TDD downlink subframe has the second timing configuration, identifying a third TDD uplink subframe for transmission of HARQ feedback, and configuring HARQ feedback from the first TDD downlink subframe or the second TDD downlink subframe, or both, to be transmitted in the third TDD uplink subframe.

In some examples of the method, apparatus, and non-transitory computer-readable medium described above, one or more of the downlink communication or the responsive uplink communication may be transmitted using a shared radio frequency spectrum band, and where the method, apparatus, and non-transitory computer-readable medium may further include processes, features, means, or instructions for modifying one or more of a cross-transmission opportunity scheduling configuration or a number of HARQ feedback processes based on the capability of the UE to transmit the responsive uplink communication within the first time difference or the second time difference.

In some examples of the method, apparatus, and non-transitory computer-readable medium described above, the transmitting includes transmitting an uplink grant to the UE. In some examples of the method, apparatus, and non-transitory computer-readable medium described above, the transmitting includes transmitting an uplink data transmission responsive to an uplink grant received from a base station.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
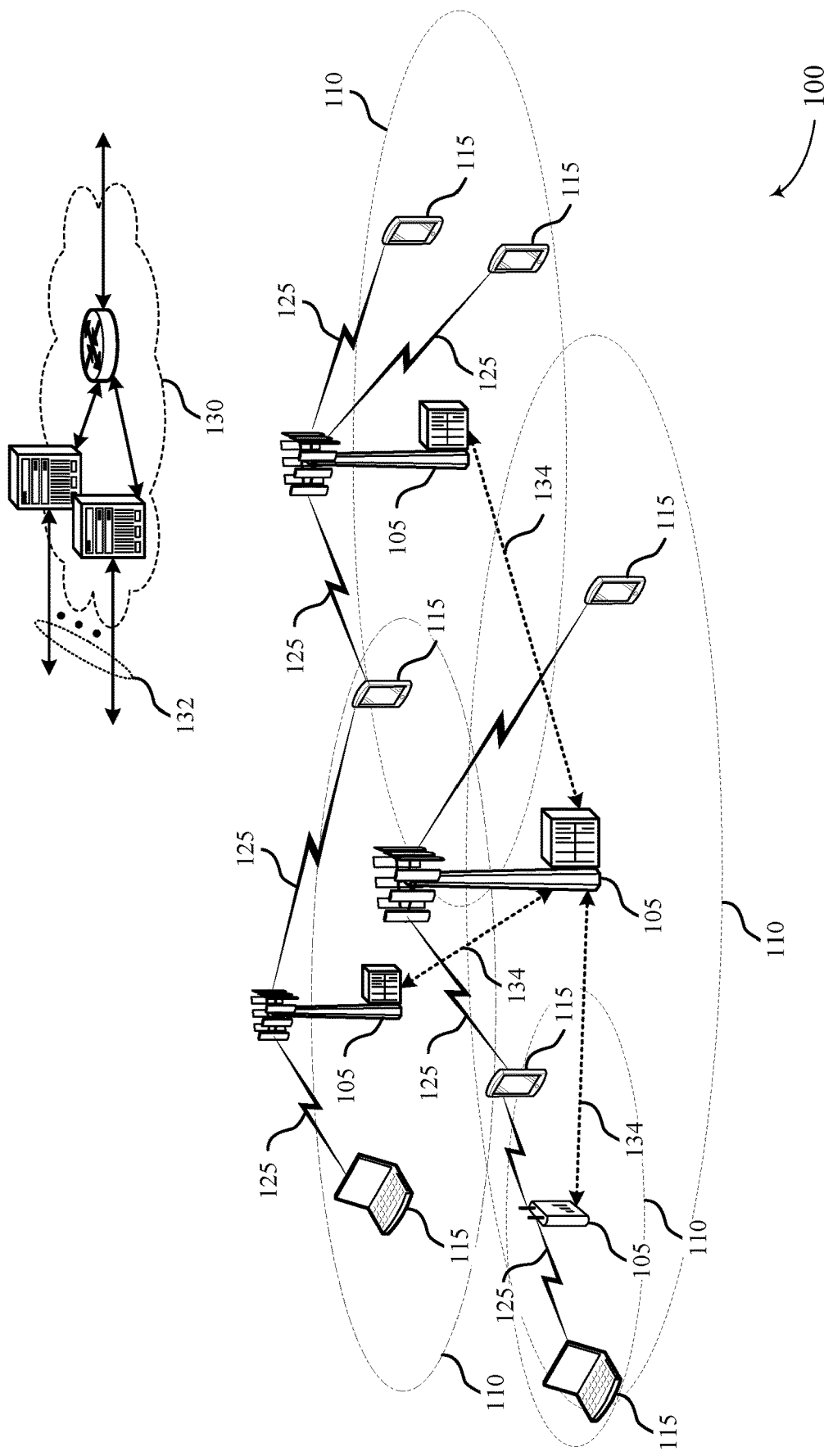
FIG. 1 illustrates an example of a system for wireless communication that supports latency reduction techniques in wireless communications in accordance with aspects of the present disclosure.

A user equipment (UE) or a base station operating in a wireless communications system may account for the UE's capabilities when scheduling communications and transmitting to provide for reduced timing between a downlink (DL) communication and a responsive uplink (UL) communication. For example, the UE may have capabilities of operating according to two or more timing configurations and resources may be allocated for transmissions based on the capability of the UE to transmit the responsive uplink communication within a first time difference (e.g., a legacy LTE time difference), or a second time difference (e.g., a reduced time difference relative to the legacy LTE time difference).

By way of example, certain legacy UEs may operate with a timing configuration in which a downlink transmission containing a grant of uplink resources may be transmitted in subframe n, and the responsive uplink communication may occur at subframe n+4 or later. As used herein, legacy may refer to UEs, base stations, or other devices or components that are operating according to a prior release of a wireless communications standard. Such legacy UEs may operate with a timing configuration in which a downlink transmission containing data may be transmitted in subframe n. The UE may receive the data transmission, process the received transmission, and generate a hybrid automatic repeat request (HARD) acknowledgment/negative-acknowledgment (ACK/NACK) feedback to be transmitted at subframe n+4. Various aspects of the present disclosure provide for reduced timings between such downlink communications and responsive uplink communications, which may reduce latency in the communications and enhance overall efficiency of the wireless communications system. For example, for a downlink communication transmitted in subframe n, responsive uplink communications may be transmitted in subframe n+3 or n+2.

In some examples, a UE or base station may be capable of operating using two or more timing configurations that each include an associated time period between receipt of a downlink communication and a responsive uplink communication. In cases where a UE or base station are capable of two or more timing configurations, a timing configuration for a transmission may be determined and the responsive uplink communication transmitted according to the determined timing configuration. In cases where a reduced time period is used for transmissions, latency of the system may be reduced and the efficiency of the system enhanced.

In some cases, both a reduced time period (e.g., n+k, where k<4) and a legacy time period (e.g., n+4) may be supported by a UE, and the UE may fallback to legacy operation in some cases where reduced timing is not feasible or practical. In order to determine which of a reduced time period timing configuration or a legacy timing configuration is to be used for a transmission, a UE may receive signaling or evaluate one or more parameters associated with the transmission. For example, if downlink control information (DCI) associated with the transmission is located in a common search space (CSS) in a physical downlink control channel (PDCCH) transmission, the UE may determine that the legacy timing configuration is to be used. If DCI associated with the transmission is located in a UE-specific search space (UESS) in the PDCCH transmission, the UE may determine that the reduced time period timing configuration is to be used. In other examples, DCI formats may be used to determine a timing configuration to use (e.g., DCI format 1A may indicate a legacy timing configuration and mode-dependent DCI may indicate a reduced time period timing configuration).

In some cases where carrier aggregation (CA) or dual-connectivity (DC) provide multiple concurrent transmissions, fallback capability to the legacy timing configuration may be provided for a primary carrier or cell, but not one or more secondary carriers or cells. In other cases, fallback capability to the legacy timing configuration may be provided for both primary and secondary component carriers (CCs) or cells. In some cases, reduced time period timing configurations are provided only in cases where each CC is capable of supporting the reduced time period. In some examples, if reduced time period timing configurations are supported on any of the CCs ePDCCH-based scheduling may not be supported on any of the CCs, or may be allowed with different transport block size (TBS) limitations than PDCCH-based scheduling grants. In examples where different CCs may have different timing configurations, a same uplink subframe may in some instances be identified for transmitting uplink control information (e.g., HARQ ACK/NACK feedback) for different downlink subframes. In such instances, parallel uplink control channel transmissions may be transmitted, the control information may be multiplexed over a same uplink control channel resource, or the uplink control channel for one of the CCs may be dropped.

In some cases, the reduced time period timing configuration may not impact broadcast transmissions, single-carrier point-to-multipoint (SC-PTM) transmissions, or transmissions that do not have an associated responsive uplink transmission (e.g., system information block (SIB) related transmissions, random access related transmissions, or other transmissions that do not have HARQ feedback).

In order to provide for reduced time period timing configurations, certain transmission parameters may be modified or have maximum value restrictions. For example, timing advance (TA) values may be restricted to provide reduced propagation delay for transmissions having reduced time period timing configurations. In some cases, a transport block size (TBS) may have a maximum value restriction to provide for processing in less time, and such size restrictions may be rank-dependent restrictions. Timing configurations, in some cases, may be changed dynamically or changed semi-statically. In some cases, HARQ operations, physical uplink control channel (PUCCH) resource handling, channel state information (CSI) handling, and/or sounding reference signal (SRS) operations may be modified based on the timing configuration for a transmission. Additionally or alternatively, time division duplexing (TDD) communications may be modified to provide downlink association set changes and uplink scheduling changes based on different timing configurations. In cases that use shared radio frequency spectrum for some or all wireless transmissions, various scheduling and HARQ operations may be determined based on different timing configurations.

Aspects of the disclosure are introduced above are described below in the context of a wireless communications system. Subsequent figures depict examples of timing configurations that support latency reduction. Aspects of the disclosure are further illustrated by and described with reference to apparatus diagrams, system diagrams, and flowcharts that relate to latency reduction techniques in wireless communications.

FIG. 1 illustrates an example of a wireless communications system 100 that supports latency reduction techniques in wireless communications in accordance with various aspects of the present disclosure. The wireless communications system 100 includes base stations 105, UEs 115, and a core network 130. In some examples, the wireless communications system 100 may be a LTE (or LTE-Advanced) network. One or more of the UEs 115 may have a capability for reduced time period timing configurations, and one or more of the base stations 105 may account for such capabilities when scheduling communications and transmitting to provide for reduced timing between a downlink communication and a responsive uplink communication.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, etc. The UEs 115 may have differing capabilities, including a capability to use one or several timing configurations that have various time differences between a downlink communication and a responsive uplink communication.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105. A base station 105 or other entity within the core network 130 may schedule communications with a UE 115 to account for the UE's 115 capability to transmit responsive uplink communications within a certain time difference.

In some cases, wireless communications system 100 may utilize enhanced component carriers (eCCs). An eCC may be characterized by one or more features including: wider bandwidth, shorter symbol duration, shorter transmission time interval (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

HARQ may be a method of ensuring that data is received correctly over a wireless communication link 125. HARQ may include a combination of error detection (e.g., using a cyclic redundancy check (CRC)), forward error correction (FEC), and retransmission (e.g., automatic repeat request (ARQ)). HARQ may improve throughput at the media access control (MAC) layer in poor radio conditions (e.g., signal-to-noise conditions). In incremental redundancy HARQ, incorrectly received data may be stored in a buffer and combined with subsequent transmissions to improve the overall likelihood of successfully decoding the data. In some cases, redundancy bits are added to each message prior to transmission. This may be useful in poor radio conditions. In other cases, redundancy bits are not added to each transmission, but are retransmitted after the transmitter of the original message receives a NACK indicating a failed attempt to decode the information. The chain of transmission, response, and retransmission may be referred to as a HARQ process. In some cases, a limited number of HARQ processes may be used for a given communication link 125. HARQ feedback may be transmitted, in some cases, in a physical HARQ indicator channel (PHICH).

Different timing configurations may be used for HARQ feedback. For example, a time difference between a downlink data transmission and a responsive uplink communication that includes an acknowledgement (ACK) or negative ACK (NACK) may vary depending on timing configuration that is employed. The timing configuration used for communications with a UE 115 may depend on the UE's 115 capability, including a capability to switch components (e.g., within an RF chain) between uplink and downlink modes.

PUCCH may be used for UL ACKs, scheduling requests (SRs) and channel quality indicator (CQI), and other UL control information. A PUCCH may be mapped to a control channel defined by a code and two consecutive resource blocks. UL control signaling may depend on the presence of timing synchronization for a cell. PUCCH resources for SR and CQI reporting may be assigned (and revoked) through radio resource control (RRC) signaling. In some cases, resources for SR may be assigned after acquiring synchronization through a random access channel (RACH) procedure. In other cases, an SR may not be assigned to a UE 115 through the RACH (i.e., synchronized UEs may or may not have a dedicated SR channel). PUCCH resources for SR and CQI may be lost when the UE is no longer synchronized.

A base station 105 may gather channel condition information from a UE 115 in order to efficiently configure and schedule the channel. This information may be sent from the UE 115 in the form of a channel state report. A channel state report may contain a rank indicator (RI) requesting a number of layers to be used for DL transmissions (e.g., based on the antenna ports of the UE 115), a precoding matrix index (PMI) indicating a preference for which precoder matrix should be used (based on the number of layers), and a channel quality indicator (CQI) representing the highest modulation and coding scheme (MCS) that may be used. CQI may be calculated by a UE 115 after receiving predetermined pilot symbols such as a common reference signal (CRS) or CSI reference signal (CSI-RS). RI and PMI may be excluded if the UE 115 does not support spatial multiplexing (or is not in support spatial mode). The types of information included in the report determines a reporting type. Channel state reports may be periodic or aperiodic. That is, a base station 105 may configure a UE 115 to send periodic reports at regular intervals, and may also request additional reports as needed. Aperiodic reports may include wideband reports indicating the channel quality across an entire cell bandwidth, UE selected reports indicating a subset of the best subbands, or configured reports in which the subbands reported are selected by the base station 105.

PDCCH carries DCI in at least one control channel element (CCE), which may include nine logically contiguous resource element groups (REGs), where each REG contains 4 resource elements. DCI includes information regarding DL scheduling assignments, UL resource grants, transmission scheme, UL power control, HARQ information, MCS and other information. The size and format of the DCI messages can differ depending on the type and amount of information that is carried by the DCI. For example, if spatial multiplexing is supported, the size of the DCI message is large compared to contiguous frequency allocations. Similarly, for a system that employs multiple input multiple output (MIMO), the DCI must include additional signaling information. DCI size and format depend on the amount of information as well as factors such as bandwidth, the number of antenna ports, and duplexing mode. PDCCH can carry DCI messages associated with multiple users, and each UE 115 may decode the DCI messages that are intended for it.

For example, each UE 115 may be assigned a cell radio network temporary identifier (C-RNTI) and CRC bits attached to each DCI may be scrambled based on the C-RNTI. To reduce power consumption and overhead at the user equipment, a limited set of CCE locations can be specified for DCI associated with a specific UE 115. CCEs may be grouped (e.g., in groups of 1, 2, 4, and 8 CCEs), and a set of CCE locations in which the user equipment may find relevant DCI may be specified. These CCEs may be known as a search space. The search space can be partitioned into two regions: a common CCE region or search space and a UE-specific (dedicated) CCE region or search space. The common CCE region is monitored by all UEs served by a base station 105 and may include information such as paging information, system information, random access procedures, and the like. The UE-specific search space may include user-specific control information. CCEs may be indexed, and the common search space may start from CCE 0. The starting index for a UE specific search space depends on the C-RNTI, the subframe index, the CCE aggregation level and a random seed. A UE 115 may attempt to decode DCI by performing a process known as a blind decode, during which search spaces are randomly decoded until the DCI is detected. During a blind decode, the UE 115 may attempt descramble all potential DCI messages using its C-RNTI, and perform a CRC check to determine whether the attempt was successful.

Carriers may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined. For TDD frame structures, each subframe may carry UL or DL traffic, and special subframes may be used to switch between DL and UL transmission. Allocation of UL and DL subframes within radio frames may be symmetric or asymmetric and may be statically determined or may be reconfigured semi-statically. Special subframes may carry DL or UL traffic and may include a Guard Period (GP) between DL and UL traffic. Switching from UL to DL traffic may be achieved by setting a timing advance (TA) at the UE 115 without the use of special subframes or a guard period. UL-DL configurations with switch-point periodicity equal to the frame period (e.g., 10 ms) or half of the frame period (e.g., 5 ms) may also be supported.

For example, TDD frames may include one or more special frames, and the period between special frames may determine the TDD DL-to-UL switch-point periodicity for the frame. Use of TDD offers flexible deployments without requiring paired UL-DL spectrum resources. In some TDD network deployments, interference may be caused between UL and DL communications (e.g., interference between UL and DL communication from different base stations, interference between UL and DL communications from base stations and UEs, etc.). For example, where different base stations 105 serve different UEs 115 within overlapping coverage areas according to different TDD UL-DL configurations, a UE 115 attempting to receive and decode a DL transmission from a serving base station 105 can experience interference from UL transmissions from other, proximately located UEs 115.

A base station 105 may insert periodic pilot symbols such as CRS to aid UEs 115 in channel estimation and coherent demodulation. CRS may include one of 504 different cell identities. They may be modulated using QPSK and power boosted (e.g., transmitted at 6 dB higher than the surrounding data elements) to make them resilient to noise and interference. CRS may be embedded in 4 to 24 resource elements in each resource block based on the number of antenna ports or layers (up to 4) of the receiving UEs 115. In addition to CRS, which may be utilized by all UEs 115 in the coverage area 110 of the base station 105, demodulation reference signal (DM-RS) may be directed toward specific UEs 115 and may be transmitted only on resource blocks assigned to those UEs 115. DM-RS may include signals on 12 resource elements in each resource block in which they are transmitted. The DM-RS for different antenna ports may each utilize the same 12 resource elements, and may be distinguished using different orthogonal cover codes (e.g., masking each signal with a different combination of 1 or −1 in different resource elements). In some cases, two sets of DM-RS may be transmitted in adjoining resource elements. In some cases, additional reference signals known as channel state information reference signals (CSI-RS) may be included to aid in generating CSI. On the UL, a UE 115 may transmit a combination of periodic SRS and UL DM-RS for link adaptation and demodulation, respectively.

A UE 115 may be configured to collaboratively communicate with multiple eNBs 105 through, for example, Multiple Input Multiple Output (MIMO), Coordinated Multi-Point (CoMP), or other schemes. MIMO techniques use multiple antennas on the base stations or multiple antennas on the UE to take advantage of multipath environments to transmit multiple data streams. CoMP includes techniques for dynamic coordination of transmission and reception by a number of eNBs to improve overall transmission quality for UEs as well as increasing network and spectrum utilization.

The base stations 105 of system 100 may each simultaneously support communication for one or more multiple communication devices, such as UEs 115. As indicated above, and as will be discussed in more detail below, various examples may provide multiple different timing configurations for transmissions between UEs 115 and base stations 105.

Figure 2:
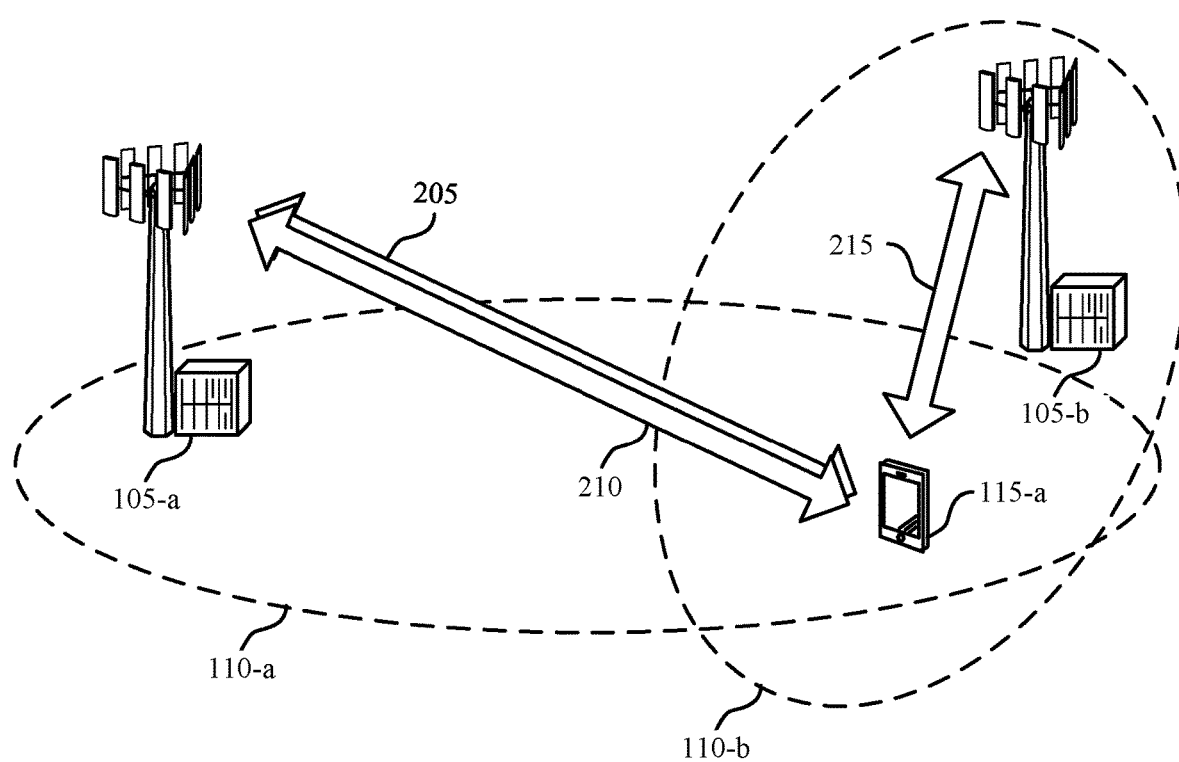
FIG. 2 illustrates an example of a wireless system that supports latency reduction in wireless communications in accordance with aspects of the present disclosure.

FIG. 2 illustrates an example of a wireless communications system 200 for latency reduction techniques in wireless communications. UE 115-*a* may be an example of a UE 115 as described herein with reference to FIG. 1. UE 115-*a* may be configured for multiple timing configurations, and may support communication on one or more component carriers (CCs) such as first CC 205 and second CC 210, which may be TDD or FDD. UE 115-*a* also may be configured for dual connectivity communications with first base station 105-*a* and second base station 105-*b* via carrier 215, which may be examples of base stations 105 as described herein with reference to FIG. 1. One of the CCs, such as first CC 205 may be configured as a primary cell (Pcell) for UE 115-*a*. The first base station 105-*a* may have an associated coverage area 110-*a*, and the second base station 105-*b* may have associated coverage area 110-*b*.

As indicated above, in some cases UE 115-*a* may be capable of multiple timing configurations. For example, the UE 115-*a* may have capabilities to receive a downlink transmission and transmit a responsive uplink communication within a first time difference (e.g., a legacy LTE time difference), or a second time difference (e.g., a reduced time difference relative to the legacy LTE time difference). In some examples, UE 115-*a* or base stations 105 may be capable of operating using two or more timing configurations that each include a different associated time period between a downlink communication and a responsive uplink communication. In cases where a reduced time period is used for transmissions, latency of the system may be reduced and the efficiency of the system enhanced.

In legacy timing configurations (e.g., n+4 timing configurations), timing may be based on enhanced PDCCH (ePDCCH) control transmissions and a maximum TA value of 667 µs, corresponding to a 100 km site distance between a base station 105 and UE 115-*a*. In some examples, base stations 105 may reduce the maximum site distance in order to reduce the TA associated with transmissions to enable reduced timing configurations. For example, a reduction in the site distance from 100 km to 10 km reduces a TA value by approximately 600 µs, and a maximum TA of 67 µs may be established for reduced timing configurations. In ePDCCH control transmissions, control information may span an entire subframe, while PDCCH control transmissions may span only a subset of symbols within a subframe (e.g., four symbol or less control region size). In some examples, reduced timing configurations may provide that DCI may be transmitted in PDCCH control transmissions, which may provide the control channel transmission earlier within a subframe and provide additional processing time. For example, with PDCCH scheduling a time savings corresponding to 10 symbols (714 µs) for normal cyclic prefix (CP) or eight symbols (667 µs) for extended CP. Accordingly, using a maximum TA as indicated above along with PDCCH scheduling may provide time savings of approximately 1.314 ms (normal CP) or 1.267 ms (extended CP). Such techniques may provide that a responsive uplink communication may be transmitted one subframe earlier, assuming 1 ms subframes, thus providing n+3 timing.

In some cases, further timing reductions may be provided that may allow for n+2 timing. In such cases, a maximum TBS may be provided such that the transport blocks associated with a downlink transmission are processed faster at the UE 115-a and enable n+2 reduced timing. In some cases where TBS restrictions are applied for n+3 timing, the maximum value for TA may be selected to provide an even subframe timing (e.g., a maximum TA of 333 µs, corresponding to a 50 km site distance, may be applied when using TBS restrictions to provide a 1 ms time reduction for an even subframe timing). Such TA and TBS limitations may also depend on other features, such as, for example, carrier aggregation (CA), network assisted interference cancellation (NAIC), or enhanced interference mitigation and traffic adaptation (eIMTA) that may be present. In some examples that use CA, multiple TA group configurations may be provided in which different UL CCs may have a maximum transmit timing difference of about 31 µs, which may be counted into the maximum TA allowance. For example, in the non-CA case, a 100 µs maximum TA limitation implies a maximum 15 km site distance ($100 \mu s * 3 * 10^8/2$), but when operating in CA mode, the adjustment to the maximum TA limitation implies a 10.3 km site distance $((100 \mu s - 31.3 \mu s) * 3 * 10^8/2)$.

In some cases, reduced timing configurations and legacy timing configurations may be semi-statically configured. In other cases, reduced timing configurations and legacy timing configurations may be dynamically configured. In some examples that provide dynamic configuration, DCI may be provided in a PDCCH transmission associated with a reduced timing configuration (e.g., n+3 or n+2 timing), and DCI may be provided in an ePDCCH transmission associated with another timing (e.g., n+4 (legacy) timing). Thus, UE 115-a may be scheduled with PDCCH in one subframe, but with ePDCCH in another subframe, and thus dynamically switched from n+4 to n+3 timing. In some examples, UE 115-a may indicate a capability of n+k timing where k<4, which may be applicable to PDCCH only. For example, for k=3, the UE 115-a may do n+3 timing for PDCCH only, and n+4 timing for both PDCCH and ePDCCH. In examples where k=2, the UE 115-a may do n+2 timing for PDCCH control transmissions only, but may do n+3 or n+4 timing for PDCCH/ePDCCH control transmissions.

As indicated above, in some cases TBS limitations may be provided in order to enable reduced timing configurations. In some examples, TBS limitations may be provided for certain timing configurations (e.g., n+3 timing), and may be dependent on UE 115-a capability. In some examples, TBS restrictions may be rank-dependent, and dependent on a maximum rank (Rmax) of the UE 115-a. For example, there may be no TBS restriction transmissions for ranks R and lower, where R may depend on UE category (e.g., Category 2 UE, R=1; Category 5 UE, R=2). For transmissions with rank>R, restrictions may be, in some examples, a function of rank. For example, a restricted TBS may be provided for a rank r to provide a TBS restriction based on a product of a maximum TBS and R/r, where $R<r<=R_{max}$. In some cases, parallel processing may help reduce the processing time for multi-layer transmissions, and thus the resulting reduction of TBS may not be linear with the number of layers. In cases that use carrier aggregation or dual connectivity, instead of placing the restriction on TBS on a per CC basis, restrictions may be placed jointly on the set or a subset of the configured CCs, due to the UE 115-a having an overall processing limitation.

Figure 3:
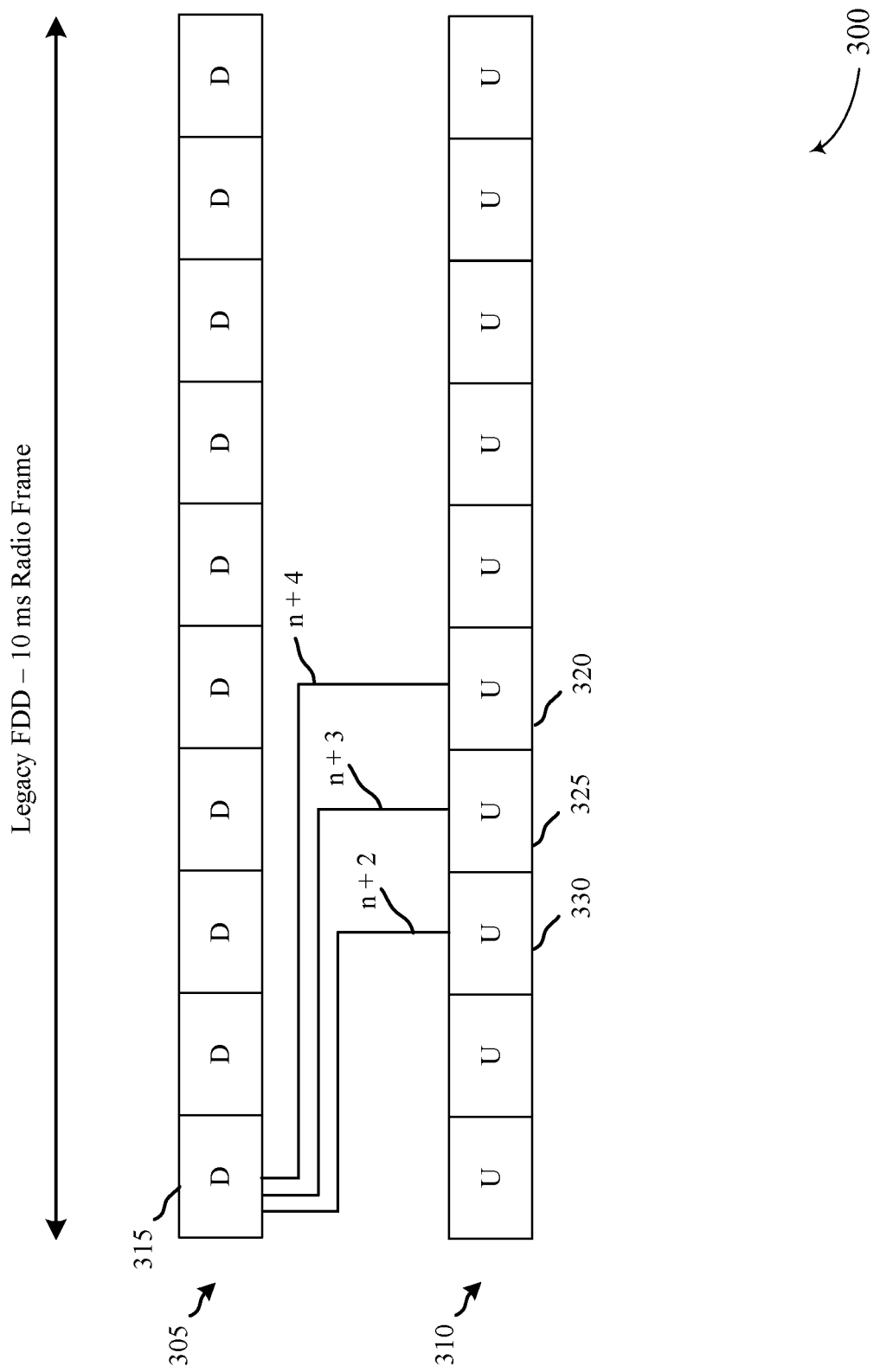
FIG. 3 illustrates an example of a frame structure that supports latency reduction in wireless communications in accordance with aspects of the present disclosure.

FIG. 3 illustrates an example of a frame structure 300 for latency reduction techniques in wireless communications. Frame structure 300 may be used for communications between UEs 115 and base stations 105 as discussed in FIGS. 1-2. Frame structure 300 may include downlink transmissions 305 and uplink transmissions 310, which may make up a legacy LTE 10 ms radio frame (e.g., LTE FS1).

As indicated above, a legacy timing configuration may operate with a legacy timing in which a first downlink subframe 315 may contain a downlink transmission with a grant of uplink resources or downlink data, and the responsive uplink communication may occur at uplink subframe n+4 320. In a n+3 reduced timing configuration, first downlink subframe 315 may contain a downlink transmission with a grant of uplink resources or downlink data, and the responsive uplink communication may occur at uplink subframe n+3 325. Similarly, in a n+2 reduced timing configuration, first downlink subframe 315 may contain a downlink transmission with a grant of uplink resources or downlink data, and the responsive uplink communication may occur at uplink subframe n+2 330.

While this example provides an example of downlink transmissions with an associated responsive uplink transmission, similar timing configurations may be provided for uplink transmissions with an associated responsive downlink transmission. In some cases, different timing configurations may be provided for uplink and downlink communications. For example, a n+3 timing configuration may be used for downlink communications versus an n+2 timing configuration for uplink communications. Such configurations may allow additional processing time for downlink processing, which may be relatively intensive for physical downlink shared channel (PDSCH) decoding. In some cases, uplink processing may also be relatively intensive, due to CSI processing and physical uplink shared channel (PUSCH) encoding, and aperiodic CSI (A-CSI) may not be allowed to be triggered. For example, an n+2 timing configuration may be used for uplink without A-CSI triggering, and an n+3 timing configuration may be used for downlink communications. In other examples, A-CSI may be triggered but with a reference measurement subframe earlier than the triggering subframe. In some examples, the downlink timing gap may be configured to be no less than that for uplink communications due to more intensive downlink processing. For example, possible combinations of timing may be: {DL timing, UL timing}={n+4, n+4}, {n+4, n+3}, {n+4, n+2}, or {n+3, n+3}, {n+3, n+2}, or {n+2, n+2}.

While the example of FIG. 3 illustrates a FDD frame structure, reduced timing configurations may also be provided for TDD frame structures. Table 1, below, depicts various TDD frame configurations, where "D" represents a downlink subframe, "U" represents an uplink subframe, and "S" represents a special subframe.

TABLE 1 depicts multiple configurations of subframes.

| Configuration | SF 0 | SF 1 | SF 2 | SF 3 | SF 4 | SF 5 | SF 6 | SF 7 | SF 8 | SF 9 |
|---|---|---|---|---|---|---|---|---|---|---|
| Configuration 0 | D | S | U | U | U | D | S | U | U | U |
| Configuration 1 | D | S | U | U | D | D | S | U | U | D |
| Configuration 2 | D | S | U | D | D | D | S | U | D | D |

TABLE 1-continued depicts multiple configurations of subframes.

| Configuration | SF 0 | SF 1 | SF 2 | SF 3 | SF 4 | SF 5 | SF 6 | SF 7 | SF 8 | SF 9 |
|---|---|---|---|---|---|---|---|---|---|---|
| Configuration 3 | D | S | U | U | U | D | D | D | D | D |
| Configuration 4 | D | S | U | U | D | D | D | D | D | D |
| Configuration 5 | D | S | U | D | D | D | D | D | D | D |
| Configuration 6 | D | S | U | U | U | D | S | U | U | D |

A UE may transmit at different times and in different subframes depending on the frame configuration for a given transmission. For different timing configurations, downlink association sets may change, and uplink scheduling may change. The downlink HARQ association set of an example is depicted in Table 2 for different timing configurations. In Table 2, uplink subframe n is associated with downlink subframes n−k. Thus the numbers in the top row of Table 2 are the uplink subframe number (n), with the numbers in lower rows (k) identifying the associated downlink subframe. This example is for TDD configuration 0.

TABLE 2 depicts DL HARQ association set for different timing configurations; TDD config. 0.

| Case | SF 0 | 1 | 2 | 3 | 4 | 5 | 6 | 7 | 8 | 9 |
|---|---|---|---|---|---|---|---|---|---|---|
| n + 4 | — | — | 6 | — | 4 | — | — | 6 | — | 4 |
| n + 3 | — | — | — | 3 | 3 | — | — | — | 3 | 3 |
| n + 2 | — | — | 2 | 2 | — | — | — | 2 | 2 | — |

In examples that have multiple possible timing configurations, and thus multiple downlink HARQ timings, a union of downlink association sets for a timing configuration may be used, in some examples, such as depicted in Table 3, which illustrates alternative 1 for a union of association sets for n+4 timing and n+3 timing.

TABLE 3 depicts alternative 1 of a union of DL HARQ association sets for different timing configurations for TDD configuration 0.

| Case | SF 0 | 1 | 2 | 3 | 4 | 5 | 6 | 7 | 8 | 9 |
|---|---|---|---|---|---|---|---|---|---|---|
| n + 4 or n + 3 | — | — | 6 | 3 | 4, 3 | — | — | 6 | 3 | 4, 3 |

In other examples that have multiple possible timing configurations, a union of downlink association sets for a timing configuration may be used but with only one valid downlink association set for an uplink subframe, based on a scheduling decision, such as depicted in Table 4, which illustrates alternative 2 of a union of association sets for n+4 timing or n+3 timing but not both.

TABLE 4 depicts alternative 2 of a union of DL HARQ association sets for different timing configurations for TDD configuration 0.

| Case | SF 0 | 1 | 2 | 3 | 4 | 5 | 6 | 7 | 8 | 9 |
|---|---|---|---|---|---|---|---|---|---|---|
| n + 4 or n + 3 but not both | — | — | 6 | 3 | 4 or 3 | — | — | 6 | 3 | 4 or 3 |

Tables 5 through 16 depict example downlink HARQ association sets for different timing configurations for TDD configuration 1 through TDD configuration 6 for each alternative of unions discussed above. TDD configuration 1 is depicted in tables 5 and 6.

TABLE 5 depicts DL HARQ association set for different timing configurations for TDD configuration 1.

| Case | SF 0 | 1 | 2 | 3 | 4 | 5 | 6 | 7 | 8 | 9 |
|---|---|---|---|---|---|---|---|---|---|---|
| n + 4 | — | — | 7, 6 | 4 | — | — | — | 7, 6 | 4 | — |
| n + 3 | — | — | 3, 6 | 3 | — | — | — | 3, 6 | 3 | — |
| n + 2 | — | — | 3, 2 | 2 | — | — | — | 3, 2 | 2 | — |

TABLE 6 depicts alternative 2 of a union of DL HARQ association sets for different timing configurations for TDD configuration 1.

| Case | SF 0 | 1 | 2 | 3 | 4 | 5 | 6 | 7 | 8 | 9 |
|---|---|---|---|---|---|---|---|---|---|---|
| n + 4 or n + 3 but not both | — | — | {7, 6} or {3, 6} | 4 or 3 | — | — | — | {7, 6} or {3, 6} | 4 or 3 | — |

TDD configuration 2 is depicted in tables 7 and 8.

TABLE 7 depicts DL HARQ association set for different timing configurations for TDD configuration 2.

| Case | SF 0 | 1 | 2 | 3 | 4 | 5 | 6 | 7 | 8 | 9 |
|---|---|---|---|---|---|---|---|---|---|---|
| n + 4 | — | — | 8, 7, 4, 6 | — | — | — | — | 8, 7, 4, 6 | — | — |
| n + 3 | — | — | 7, 4, 3, 6 | — | — | — | — | 7, 4, 3, 6 | — | — |
| n + 2 | — | — | 4, 3, 2, 6 | 2 | — | — | — | 4, 3, 2, 6 | 2 | — |

TABLE 8 depicts alternative 2 of a union of DL HARQ association sets for different timing configurations for TDD configuration 2.

| Case | SF 0 | 1 | 2 | 3 | 4 | 5 | 6 | 7 | 8 | 9 |
|---|---|---|---|---|---|---|---|---|---|---|
| n + 4 or n + 3 but not both | — | — | {8, 7, 4, 6} or {7, 4, 3, 6} | — | — | — | — | {8, 7, 4, 6} or {7, 4, 3, 6} | — | — |

TDD configuration 3 is depicted in tables 9 and 10.

TABLE 9 depicts DL HARQ association set for different timing configurations for TDD configuration 3.

| Case | SF 0 | 1 | 2 | 3 | 4 | 5 | 6 | 7 | 8 | 9 |
|---|---|---|---|---|---|---|---|---|---|---|
| n + 4 | — | — | 7, 6, 11 | 6, 5 | 5, 4 | — | — | — | — | — |
| n + 3 | — | — | 7, 6, 5 | 5, 4 | 4, 3 | — | — | — | — | — |
| n + 2 | — | — | 7, 6, 5 | 5, 4 | 4, 3 | — | — | — | — | — |

TABLE 10 depicts alternative 2 of a union of DL HARQ association sets for different timing configurations for TDD configuration 3.

| Case | SF 0 | 1 | 2 | 3 | 4 | 5 | 6 | 7 | 8 | 9 |
|---|---|---|---|---|---|---|---|---|---|---|
| n + 4 or n + 3 but not both | — | — | {7, 6, 11} or {7, 6, 5} | {6, 5} or {5, 4} | {5, 4} or {4, 3} | — | — | — | — | — |

TDD configuration 4 is depicted in tables 11 and 12.

TABLE 11 depicts DL HARQ association set for different timing configurations for TDD configuration 4.

| Case | SF 0 | 1 | 2 | 3 | 4 | 5 | 6 | 7 | 8 | 9 |
|---|---|---|---|---|---|---|---|---|---|---|
| n + 4 | — | — | 12, 8, 7, 11 | 6, 5, 4, 7 | — | — | — | — | — | — |
| n + 3 | — | — | 11, 8, 7, 6 | 6, 5, 4, 3 | — | — | — | — | — | — |
| n + 2 | — | — | 8, 7, 6, 5 | 6, 5, 4, 3 | — | — | — | — | — | — |

TABLE 12 depicts alternative 2 of a union of DL HARQ association sets for different timing configurations for TDD configuration 4.

| Case | SF 0 | 1 | 2 | 3 | 4 | 5 | 6 | 7 | 8 | 9 |
|---|---|---|---|---|---|---|---|---|---|---|
| n + 4 or n + 3 but not both | — | — | {12, 8, 7, 11} or {11, 8, 7, 6} | {6, 5, 4, 7} or {6, 5, 4, 3} | — | — | — | — | — | — |

TDD configuration 5 is depicted in tables 13 and 14.

TABLE 13 depicts DL HARQ association set for different timing configurations for TDD configuration 5.

| Case | SF 0 | 1 | 2 | 3 | 4 | 5 | 6 | 7 | 8 | 9 |
|---|---|---|---|---|---|---|---|---|---|---|
| n + 4 | — | — | 13, 12, 9, 8, 7, 5, 4, 11, 6 | — | — | — | — | — | — | — |
| n + 3 | — | — | 12, 9, 8, 7, 6, 5, 4, 3, 11 | — | — | — | — | — | — | — |
| n + 2 | — | — | 9, 8, 7, 6, 5, 4, 3, 2, 11 | — | — | — | — | — | — | — |

TABLE 14 depicts alternative 2 of a union of DL HARQ association sets for different timing configurations for TDD configuration 5.

| Case | SF 0 | 1 | 2 | 3 | 4 | 5 | 6 | 7 | 8 | 9 |
|---|---|---|---|---|---|---|---|---|---|---|
| n + 4 or n + 3 but not both | — | — | {13, 12, 9, 8, 7, 5, 4, 11, 6} or {12, 9, 8, 7, 6, 5, 4, 3, 11} | — | — | — | — | — | — | — |

TDD configuration 6 is depicted in tables 15 and 16.

TABLE 15 depicts DL HARQ association set for different timing configurations for TDD configuration 6.

| Case | SF 0 | 1 | 2 | 3 | 4 | 5 | 6 | 7 | 8 | 9 |
|---|---|---|---|---|---|---|---|---|---|---|
| n + 4 | — | — | 7 | 7 | 5 | — | — | 7 | 7 | — |
| n + 3 | — | — | 6 | 4 | 4 | — | — | 6 | 3 | — |
| n + 2 | — | — | 3 | 3 | 3 | — | — | 2 | 2 | — |

TABLE 16 depicts alternative 2 of a union of DL HARQ association sets for different timing configurations for TDD configuration 6.

| Case | SF 0 | 1 | 2 | 3 | 4 | 5 | 6 | 7 | 8 | 9 |
|---|---|---|---|---|---|---|---|---|---|---|
| n + 4 or n + 3 but not both | — | — | 7 or 6 | 7 or 4 | 5 or 4 | — | — | 7 or 6 | 7 or 3 | — |

In some examples, for TDD UL grant scheduling of PUSCH transmissions in subframe n, the grant may be always located in a subframe no earlier than the last downlink subframe associated with subframe n for downlink HARQ feedback. Such a technique may ensure downlink assignment index (DAI in the uplink grant only needs to count already scheduled downlink subframes, instead of counting future DL subframes.

As indicated above, in some examples timing configurations may be provided dynamically or semi-statically. In some cases, a first UE may be capable of doing n+4 timing only, a second UE may be capable of doing n+3 and n+4 timing, and a third UE may be capable of doing n+2, n+3, and n+4 timing. Additionally, a serving base station may be able to handle n+4 only, n+3 and n+4, n+2 and n+4, n+2, n+3 and n+4, etc. In such examples, a UE may be configured based on its own capability and the base station's capability for a particular timing configuration. In some examples, UE may be capable of n+2 timing and a base station may also be capable of n+2 timing, and the UE may be configured such that for rank 1 transmissions n+2 timing is used; for rank 2 transmissions n+3 timing is used; and for rank 3 and above transmissions n+4 timing is used. Similarly, if a UE is capable of n+3 timing and the base station is also capable of n+3 timing, the UE may be configured such that if PDSCH/PUSCH is scheduled by PDCCH, then n+3 timing is used; and if PDSCH/PUSCH is scheduled by ePDCCH, then n+4 timing is used. Such dynamic determination of timing may, additionally or alternatively, be based on scheduling parameters (e.g., PDCCH vs. ePDCCH, TBS size, number of layers, etc.) or an explicit indicator. In some examples, dynamic switching may be disallowed between n+4 and n+3 timings scheduled by DCIs in UE-specific search space, but allowed when DCI is in the common search space, such that n+4 timing is scheduled for common search space DCI and n+3 timing is scheduled for UE-specific search space DCI. In some cases, a UE may be capable of n+2 timing, but only for PDCCH scheduled traffic; and if it is configured with n+3 or n+4, it can be scheduled by both PDCCH and ePDCCH.

As indicated above, in some examples, HARQ operations may be determined based on one or more timing configurations used for uplink and downlink transmissions. In some examples, asynchronous HARQ may be used for transmission of ACK/NACK feedback. Such asynchronous HARQ may allow both reduced timing configurations and legacy timing configurations to be available for PUSCH scheduling for a UE. Under asynchronous HARQ, in some examples, a retransmitted transport block may have a different timing configuration that the originally transmitted transport block. In some cases, reduced timing configurations or legacy timing configurations may apply for asynchronous HARQ feedback based on determining whether to use the reduced timing configurations or the legacy timing configurations. In some cases, a number of HARQ processes may be kept at eight for FDD frame structures for each of the different timing configurations. For TDD frame structure transmissions, or for transmissions that may use shared radio frequency spectrum, the number of HARQ processes may be increased. In some examples, PUSCH transmissions may be made in a special subframe, and HARQ processes may be increased to accommodate such additional transmissions. In some examples, HARQ processes may be configured such that synchronous HARQ may be used for transmissions scheduled via the common search space, and asynchronous HARQ may be used for transmissions scheduled via the UE-specific search space. In certain examples, the PHICH may be removed for common search space synchronized uplink HARQ operations. In some examples, a HARQ process ID may be included in uplink grants.

For downlink HARQ operations, the number of HARQ processes, in some examples, may be reduced for reduced timing configurations. Soft buffer management may be based on the number of reduced HARQ processes, in such cases, which may be done on a per carrier basis under CA or dual-connectivity. For example, instead of partitioning the soft buffer allocation to a CC equally to eight HARQ processes, the soft buffer may be partitioned equally to, for example, four HARQ processes for n+2 timing instead. Such soft buffer management may increase per HARQ process soft buffer size, and hence increase the number of stored LLRs, which in some cases may benefit link level demodulation performance.

Figure 4A:
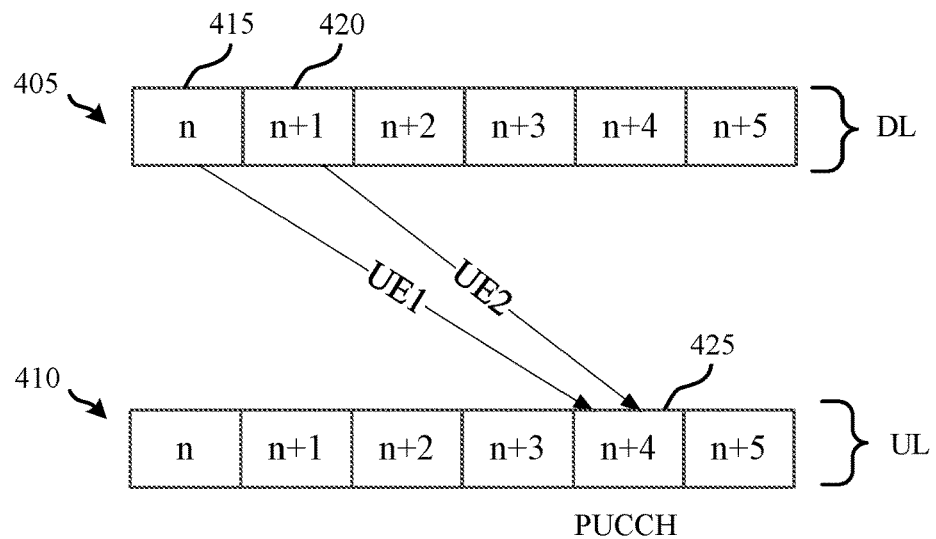
FIG. 4A illustrates an example of a frame structure that supports latency reduction techniques in wireless communications in accordance with aspects of the present disclosure.

FIG. 4A illustrates an example of a frame structure 400 for latency reduction techniques in wireless communications. Frame structure 400 may be used for communications between UEs 115 and base stations 105 as discussed in FIGS. 1-2. Frame structure 400 may include downlink transmissions 405 and uplink transmissions 410, which may make up a legacy LTE 10 ms radio frame (e.g., LTE FS1). In some cases of FS1, UEs may be expected to receive down link assignments for the same carrier where HARQ-ACK may occur in the same subframe. For example, where the downlink communication and the responsive uplink communication are transmitted using a time division duplexing (TDD) frame structure, an uplink subframe for hybrid automatic request (HARQ) feedback for the first subset or the second subset of the set of component carriers may be identified and the HARQ feedback may be transmitted during the uplink subframe without monitoring for a down link control message for the at least one component carrier during the downlink subframe if a downlink subframe for at least one component carrier of the set coincides with the uplink subframe identified for HARQ feedback.

In the example of FIG. 4A, PUCCH resource handling may be determined based on one or more timing configurations used for transmissions. For example, for PUCCH transmissions, the associated resource in some cases depends on the starting CCE or eCCE of the corresponding control channel, and for all UEs with a PUCCH in a subframe, their control channels may come from a same subframe. Thus, generally there is no conflict in starting CCE/eCCE values among different UEs when each UE uses a n+4 timing configuration. However, in the event that multiple timing configurations are used, conflict in starting CCE/eCCE values among different UEs may be present.

For example, a first UE may be scheduled with a n+4 timing configuration in subframe n 415, which may have an associated PUCCH transmission in UL subframe n+4 425. A second UE may be scheduled with a n+3 timing configuration in subframe n+1 420, which then also may have an associated PUCCH transmission in UL subframe n+4 425. In some examples, in order to avoid a conflict, a UE-specific offset associated with each new timing may be used for determining a PUCCH resource for PDSCH transmissions. Such an offset may start from the edge of the spectrum, with PUCCH resources partitioned based on different timings. In some cases, if a UE can be switched between two reduced timings, two offsets may be separately configured for the UE. Such a UE specific offset may be configured at the UE via RRC signaling, for example. In some cases, both UL signals can be multiplexed over a single PUCCH resource.

In some examples, for aperiodic CSI (A-CSI), CSI processing capability may be considered based on uplink scheduling timing. For example, if n+4 timing is configured, a first capability may be used (e.g., only provide fresh CSI updated for K1 CSI processes). If n+3 timing is configured, a second capability may be used (e.g., only provide fresh CSI updated for K2<K1 CSI processes). If n+2 timing is configured, a third capability may be used (e.g., no triggering of A-CSI). In some examples, different relaxations/capability for different CSI reporting types may be configured (e.g., wideband CSI reports vs. other CSI reports). For example, if wideband CSI reporting modes 1-0 and 1-1 are configured, a first UE capability or relaxation may be used, and otherwise, if other CSI modes are configured, a second UE capability or relaxation may be used. The reference subframe for CSI measurement may also be updated, in some examples. For example, if n+2 timing is configured, CSI may be moved from a 4 ms gap to a 2 ms gap. In some examples, for random access request (RAR) granted CSI reporting, no change may be made for the CSI reference subframe. In other examples, the reference subframe may be the same for different timing configurations, and rules may be defined for CSI measurement subframe determination. For example, a particular set of subframes for measurement may be implicitly used (e.g., similar to eIMTA CSI) or subframes for measurement may be based on an explicit indication or definition of a subset of subframes for reference. For periodic CSI (P-CSI), if the reference subframe for A-CSI is changed from a min n_{CQI, ref}=4 ms gap to a 3 ms (or less) gap, a same change may be made for P-CSI, which may simplify CSI-RS/CSI-IM related configuration and resource management.

In some examples, SRS also may be triggered using different timing configurations. For DCI scheduling in n+4 timing configurations, and DCI scheduling in n+3 timing configurations, the SRS parameter set may be the same or different for triggering aperiodic SRS. According to legacy SRS, the SRS parameters triggered by DCI format 0 and DCI format 4 can be separately configured. In some examples, if reduced timing is used, different SRS parameter sets may be established. For example, for DCI format 0 using n+4 timing, a first SRS parameter set may be used, and for DCI format 0 using n+3 timing a second SRS parameter set may be used. In some examples, the SRS symbol may be indicated as part of the SRS parameter set. In some cases, different timing for SRS transmission and PUSCH transmission may be used under the same DCI. For example, a DCI may trigger PUSCH transmission in subframe n, but SRS transmission in subframe n−1.

As indicated above, in some cases CA or dual connectivity may be used by a UE, and different CCs may have different timing configurations. For example, even if the UE is capable of doing reduced timings over all CCs, some CCs may belong to a base station or cell that is not capable of reduced timing configurations. Furthermore, in dual connectivity, the two groups of CCs may have different timings or the two groups may be asynchronous, and thus the maximum TA between the two groups may be significantly different and different timing configurations may be used based on the various parameters. In some examples, for CCs of different timings, A-CSI and/or DL HARQ ACK/NACK reporting may be configured for a set of CCs based on the timing configuration for each CC. For example, a first set of CCs may have legacy timing, while a second set of CCs may have reduced timing. In such cases, it may be disallowed for configuring a first CC from the first set and a second CC from the second set to form a set of CSI processes triggered by a same trigger in A-CSI reporting. That is, each set of CCs for an A-CSI trigger may have a same timing. In some cases, if the UE is configured with CCs within a set having different timings, the UE may simply update a fresh CSI for the CCs whose timing is larger. For example, an A-CSI trigger may trigger CSI reporting for CC1, CC3, and CC4, where CC1 is of n+3 timing, CC3 and CC4 are of n+4 timing. If the UE receives the A-CSI trigger, the UE may only be required to provide fresh CSI for CC1, but not for CC3 and CC4.

In cases where different CCs may support reduced time period timing configurations, different timing configurations may be determined based on capability of the different CCs. For example, unless all CCs are capable of supporting shortened timing, reduced time period timing configurations may not be supported. If all of the CCs are capable of supporting shortened timing, reduced time period timing configurations may be supported for one or more of the CCs. For example, if all CCs are capable of handling n+3 timing configurations, then both n+3 and n+4 configurations may be provided. However, if one of the CCs does not support n+3 timing, only n+4 timing may be used over all of the CCs.

In some examples, if shortened timing is supported on any of the CCs, ePDCCH-based scheduling may not be supported on any of the CCs. In other examples, if shortened timing is supported on any of the CCs, ePDCCH-based scheduling may be allowed, but with different TBS limitations on PDCCH-based and ePDCCH-based scheduling transmissions.

Figure 4B:
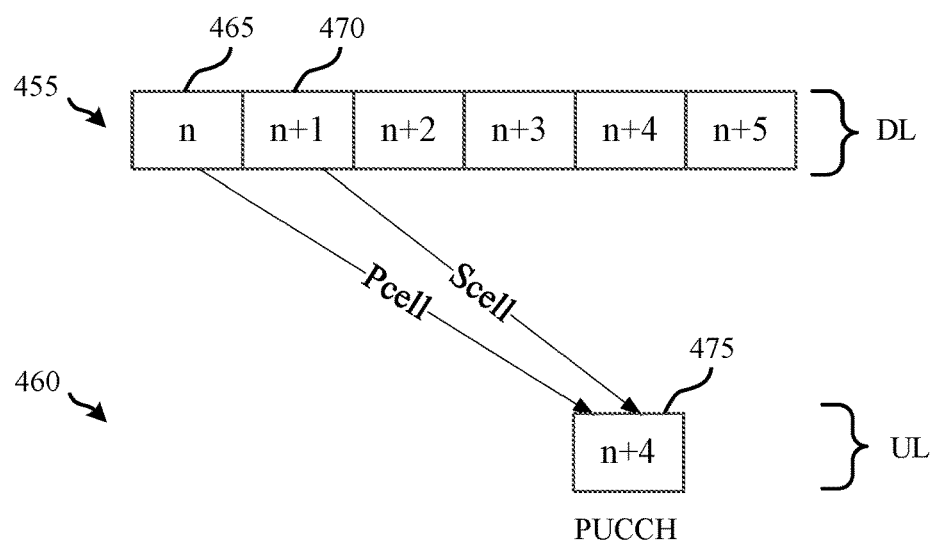
FIG. 4B illustrates an example of uplink control channel timing for different component carrier timing configurations that supports latency reduction techniques in wireless communications in accordance with aspects of the present disclosure.

In some cases, if different timing configurations are supported by different CCs, uplink control channel resources for the different CCs may collide, as illustrated in FIG. 4B, which illustrates an example of uplink control channel timing 450 for different component carrier timing configurations. Uplink control channel timing 450 may be used for communications between UEs 115 and base stations 105 as discussed in FIGS. 1-2. In this example, uplink control channel timing 450 may be based on PDSCH transmissions 455 that may have associated uplink control information to be transmitted in a PUCCH transmission 460. In the example of FIG. 4B, a primary cell (Pcell) transmission in subframe n 465 may have an n+4 timing (e.g., HARQ ACK/NACK feedback transmitted in uplink subframe n+4), while a secondary cell (Scell) transmission in subframe n+1 470 may have a reduced time period timing configuration, such as an n+3 timing (e.g., HARQ ACK/NACK feedback transmitted in uplink subframe n+3). Thus, for both the Pcell and Scell transmission, uplink control information for the different timing configurations may have colliding uplink transmissions to be transmitted in uplink subframe n+4 475.

In such examples where different CCs may have different timing configurations that indicate a same uplink subframe for transmitting uplink control information (e.g., HARQ ACK/NACK feedback) for different downlink subframes, the colliding uplink information may be handled using one or more techniques. In some examples, parallel uplink control channel transmissions may be transmitted (e.g., not a single carrier frequency division multiplexing (SC FDM) transmission). In other examples, a UE may only transmit the associated PUCCH transmission associated with one of the CCs. For example, a UE may drop the PUCCH transmission of a CC based on how the downlink transmission was scheduled. For example, if a UE receives a PDCCH CSS-based grant instead of a PDCCH UESS grant, the UE may drop the PUCCH transmission associated with the UESS grant. In other examples, if a UE receives a PDCCH-based grant instead of an ePDCCH-based grant, the UE may drop the PUCCH transmission associated with the ePDDCH-based grant.

In some examples, the uplink control information for the different CCs may be multiplexed (e.g., in frequency or in time) over a same PUCCH resource in subframe n+4 475. In some cases, the uplink control information payload might be too large to multiplex in the same PUCCH resource, and in some examples such multiplexing may be performed when it is determined that the uplink control information for each CC is able to be transmitted in the same PUCCH resource. In the event that it is determined that the combined uplink control information for the different CCs exceeds a size that may be transmitted on the PUCCH resource, parallel transmissions may be transmitted, or the uplink control information for one of the CCs may be dropped in a similar manner as described above.

For HARQ feedback in both non-CA and CA, one PUCCH may provide feedback for CCs of different timings. That is, a PUCCH in subframe n may provide HARQ feedback for PDSCH transmissions in n−4 (based on 4 ms timing) and PDSCH transmissions in subframe n−3 (based on 3 ms timing). In such cases, both HARQ transmissions may be multiplexed over a single PUCCH resource. Alternatively, each HARQ transmission may be transmitted over a PUCCH resource and two resource offsets may be specified. In other examples, HARQ feedback may be provided for one of the CCs (either for PDSCH in n−4 or PDSCH in n−3, but not both) or it may be treated as an error case if both PDSCH requiring feedback in the same UL subframe are detected. In some examples, if the PDSCH based on 4 ms timing is from DCI in the common search space, which may be treated as a valid case. Some examples may also provide dynamic ACK/NACK resource indicator (ARI) updates, and a PUCCH resource indicator may be updated from subframe n to subframe n+1 due to scheduling of new PDSCH transmissions using a new timing. In cases where dual connectivity is configured, there may be a look-ahead requirement, where a UE may determine how to transmit in subframe n based on information in subframe n+1. In such cases, if a UE is capable of n+2 timing under CA, only n+3 timing may be used in order to provide for the look-ahead requirement.

In cases where shared radio frequency spectrum is used for all or a portion of wireless communications (e.g., LTE frame structure 3 (FS3) or license-assisted access (LAA) deployments), multiple timing configurations may be configured as well. In some cases, reduced timing may impact cross-transmission opportunity (cross TxOP) management. In some examples, if n+2 timing is configured, cross-TxOP scheduling may be disallowed, and if n+3 timing or n+4 timing is configured, cross-TxOP scheduling may be allowed. Additionally or alternatively, if n+2 timing is configured, the maximum number of DL HARQ processes may be reduced from 16 to 8, and if n+3 timing or n+4 timing is configured the maximum number of DL HARQ processes may be maintained at 16.

Figure 5:
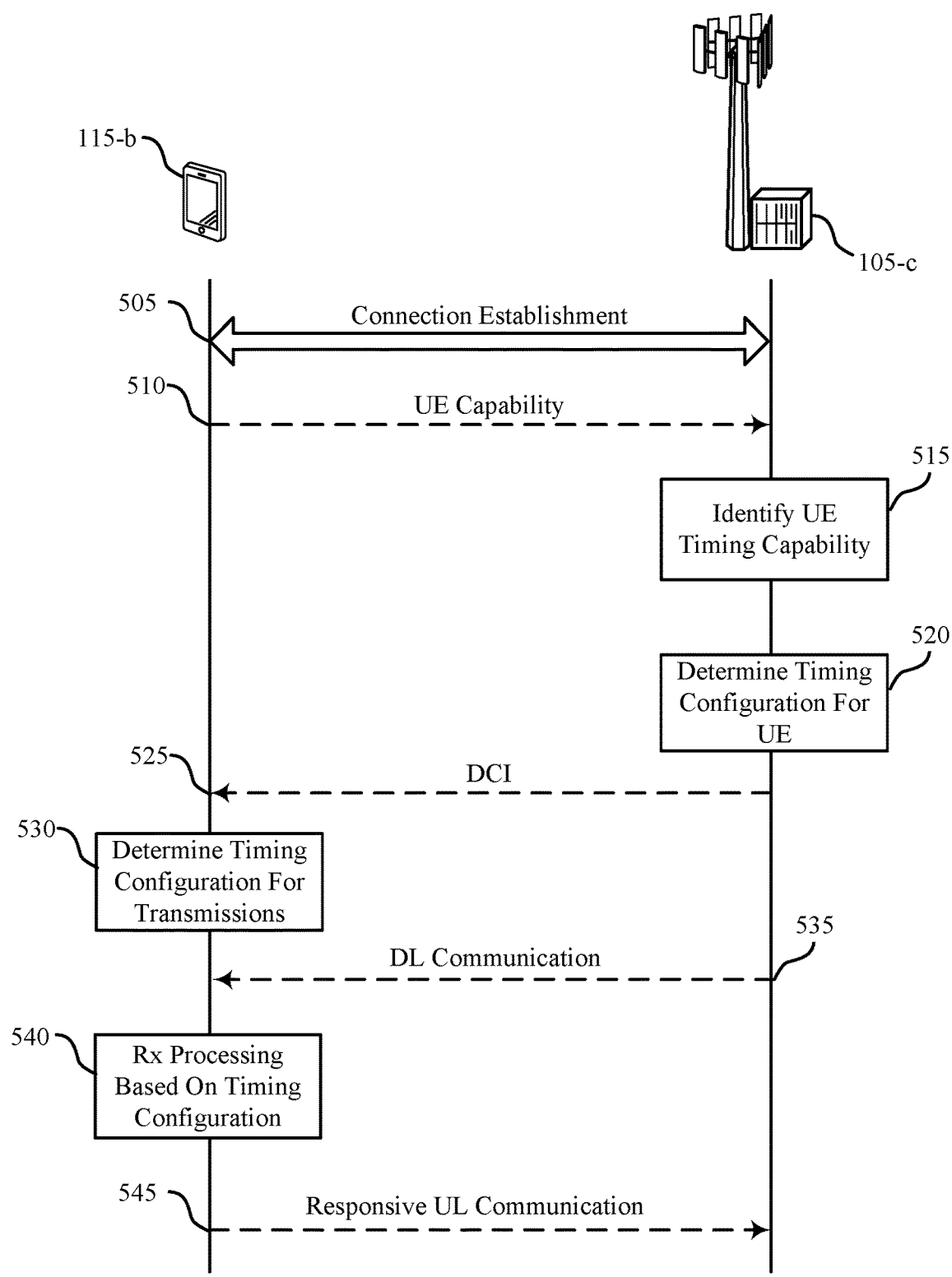
FIG. 5 illustrates an example of a process flow that supports latency reduction techniques in wireless communications in accordance with aspects of the present disclosure.

FIG. 5 illustrates an example of a process flow 500 for latency reduction techniques in wireless communications. The steps of process flow 500 may be performed by UE 115-b and base station 105-c, which may be examples of a UE 115 and a base station 105 as described above.

The base station 105-c and UE 115-b may perform a connection establishment 505 to establish an RRC connection. In some examples, various configurations of parameters may be performed as part of the connection establishment 505, such as enabling dynamic or semi-static timing configuration changes, configuring HARQ parameters, configuring PUCCH resource offsets, CSI handling, and/or SRS handling, for example. In some cases, the UE 115-b may signal UE capability 510 to base station 105-c, which may include an indication that the UE 115-b is capable of reduced timing configurations. In some examples, UE may receive RRC signaling that indicates a timing configuration and determine the timing configuration for each transmission based on the RRC signaling.

At block 515, the base station 105-c may identify the timing capability of the UE 115-b. Such an identification may be made based on the UE 115-b indicated capability, based on a reported class of UE 115-b, or based on some other signaling from the UE 115-b. In some examples, the UE 115-b capability 510 may be included in an information element provided to base station 105-c when establishing an RRC connection.

At block 520, the base station 105-c may determine a timing configuration for upcoming communications with the UE 115-b. Such a determination of timing configuration may be based on a type of transmission to be made to the UE 115-b (e.g., no reduced timing for SIB-related operations, random access related operations, broadcast transmissions, or SC-PTM transmissions). The timing configuration for the UE 115-b may also be determined based on TA or TBS restrictions for reduced timing configurations. Additionally or alternatively, the timing configuration for the UE 115-b may be determined based on a rank for the transmission, based on the presence of multiple CCs, dual connectivity, or combinations thereof.

The base station 105-c may then transmit DCI 525 to the UE 115-b. The DCI may include an indication of the timing configuration for a responsive uplink transmission, in some examples. In some cases, the DCI may be transmitted in resources spanning only a portion of a subframe (e.g., PDCCH resources) or resources spanning an entire subframe (e.g., ePDCCH resources).

At block 530, the UE 115-b may determine the timing configuration for the transmissions. For example, the UE 115-b may determine that a responsive uplink transmission is to be provided according to a reduced timing configuration, according to a legacy timing configuration, or combinations thereof. In some examples, the UE 115-b may determine the timing configuration for the transmissions based on a type of transmission (e.g., no reduced timing for SIB-related operations, random access related operations, broadcast transmissions, or SC-PTM transmissions). The timing configuration for the UE 115-b may also be determined based on TA or TBS restrictions for reduced timing configurations. Additionally or alternatively, the timing configuration for the UE 115-b may be determined based on a rank for the transmission, based on the presence of multiple CCs, dual connectivity, or combinations thereof.

The base station 105-c may then, in some examples, transmit DL communication 535. DL communication 535 may include an uplink grant or downlink data, and a responsive uplink transmission may include an uplink transmission responsive to the uplink grant of ACK/NACK feedback for the downlink data, for example.

At block 540, the UE 115-b may perform receive processing of the DL communication 535 based at least in part on the determined timing configuration. In some examples, the receive processing may include demodulation and decoding of the DL communication 535. In some cases, receive processing may be based on one or more parameters that are dependent upon the timing configuration, such as a number of HARQ processes, soft buffer management, etc. The receive processing may include, in some cases, determination or HARQ feedback, CSI processing, formatting of PUSCH transmissions, or combinations thereof. The UE 115-b may then transmit the responsive UL communication 545 to the base station 105-c.

In some examples, a downlink communication may include an uplink grant and the responsive uplink communication may include an uplink data message where the time difference associated with the communication may jointly apply to another downlink communication and another responsive uplink communication based on the determination of the timing configuration to use for the communication, where the other downlink transmission may include a downlink grant and the other responsive uplink transmission may include feedback responsive to the downlink grant.

Figure 6:
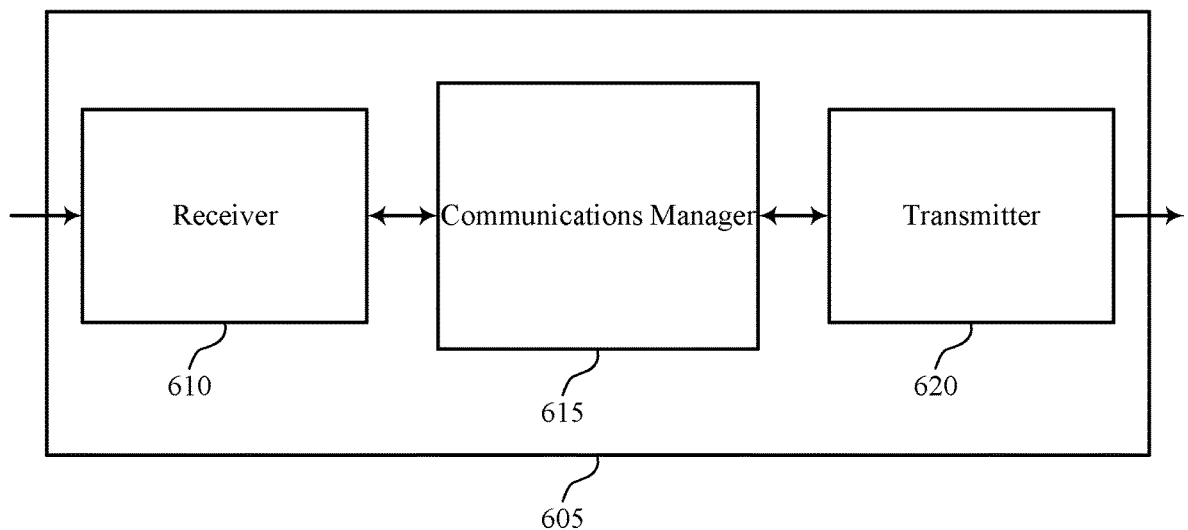
FIGS. 6 through 8 show block diagrams of a device that supports latency reduction techniques in wireless communications in accordance with aspects of the present disclosure.

FIG. 6 shows a block diagram 600 of a wireless device 605 that supports latency reduction techniques in wireless communications in accordance with various aspects of the present disclosure. Wireless device 605 may be an example of aspects of a UE 115 or base station 105 as described with reference to FIGS. 1-2. Wireless device 605 may include receiver 610, communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to latency reduction techniques in wireless communications, etc.). Information may be passed on to other components of the device. The receiver 610 may be an example of aspects of the transceiver 935 described with reference to FIG. 9.

Communications manager 615 may be an example of aspects of the communications manager 915 described with reference to FIG. 9.

Communications manager 615 may determine whether to use a first timing configuration or a second timing configuration transmissions, the first timing configuration including a first time difference between a downlink communication and a responsive uplink communication, and the second timing configuration including a second time difference between the downlink communication and the responsive uplink communication, the second time difference being less than the first time difference, and where the determination is based on a capability of a UE to transmit the responsive uplink communication within the first time difference or the second time difference and transmit according to the first timing configuration or the second timing configuration based on the determination.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or it may include a set of antennas.

Figure 7:
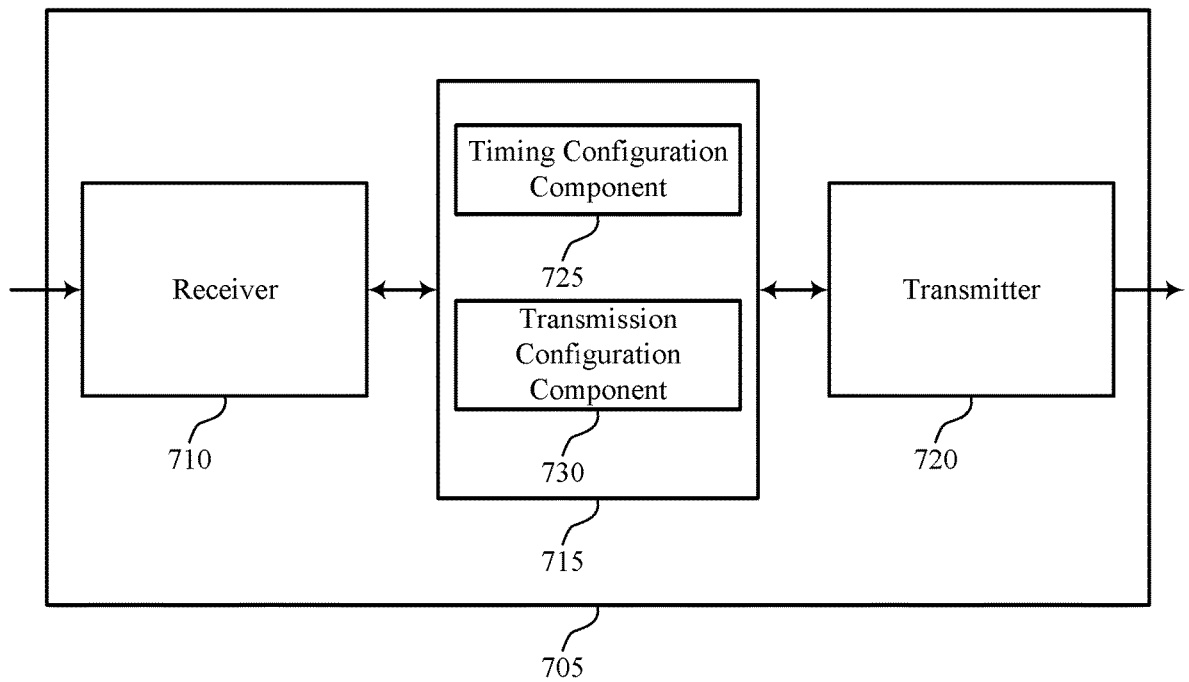

FIG. 7 shows a block diagram 700 of a wireless device 705 that supports latency reduction techniques in wireless communications in accordance with various aspects of the present disclosure. Wireless device 705 may be an example of aspects of a wireless device 605 or a UE 115 or base station 105 as described with reference to FIGS. 1, 2, and 6. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to latency reduction techniques in wireless communications, etc.). Information may be passed on to other components of the device. The receiver 710 may be an example of aspects of the transceiver 935 described with reference to FIG. 9.

Communications manager 715 may be an example of aspects of the communications manager 915 described with reference to FIG. 9. Communications manager 715 may also include timing configuration component 725 and transmission configuration component 730.

Timing configuration component 725 may determine whether to use a first timing configuration or a second timing configuration transmissions, the first timing configuration including a first time difference between a downlink communication and a responsive uplink communication, and the second timing configuration including a second time difference between the downlink communication and the responsive uplink communication, the second time difference being less than the first time difference. In some examples, the determination may be based on a capability of a UE to transmit the responsive uplink communication within the first time difference or the second time difference. The timing configuration component 725, in some examples, may modify the second timing configuration to increase the second time difference based on the UE capability based on the type of transmission to be transmitted, or combinations thereof. Timing configuration component 725 may also determine a third timing configuration that includes a third time difference between the downlink communication and the responsive uplink communication, where the third time difference is less than the second time difference. In some cases, timing configuration component 725 may determine the second timing configuration responsive to receiving the DCI for the downlink communication in the UE-specific search space. Timing configuration component 725 may, in some examples, dynamically determine the first timing configuration or the second timing configuration for each of a set of transmission time intervals (TTIs). In some cases, the dynamically determining is based on one or more scheduling parameters associated with the downlink communication. In some cases, the downlink communication is transmitted using a set of component carriers, and where the first timing configuration is determined for a first subset of the set of component carriers, and where determining the second timing configuration is determined for a second subset of the set of component carriers.

Transmission configuration component 730 may configure a transmission according to the first timing configuration or the second timing configuration based on the determination and, in conjunction with transmitter 720, transmit a responsive transmission. In some cases, transmission configuration component 730 may transmit according to the first timing configuration responsive to receiving the DCI for the downlink communication in the common search space, and transmit according to the first timing configuration or the second timing configuration based on a format of the DCI. In some cases, transmission configuration component 730 configures an uplink data transmission responsive to an uplink grant received from a base station.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or it may include a set of antennas.

Figure 8:
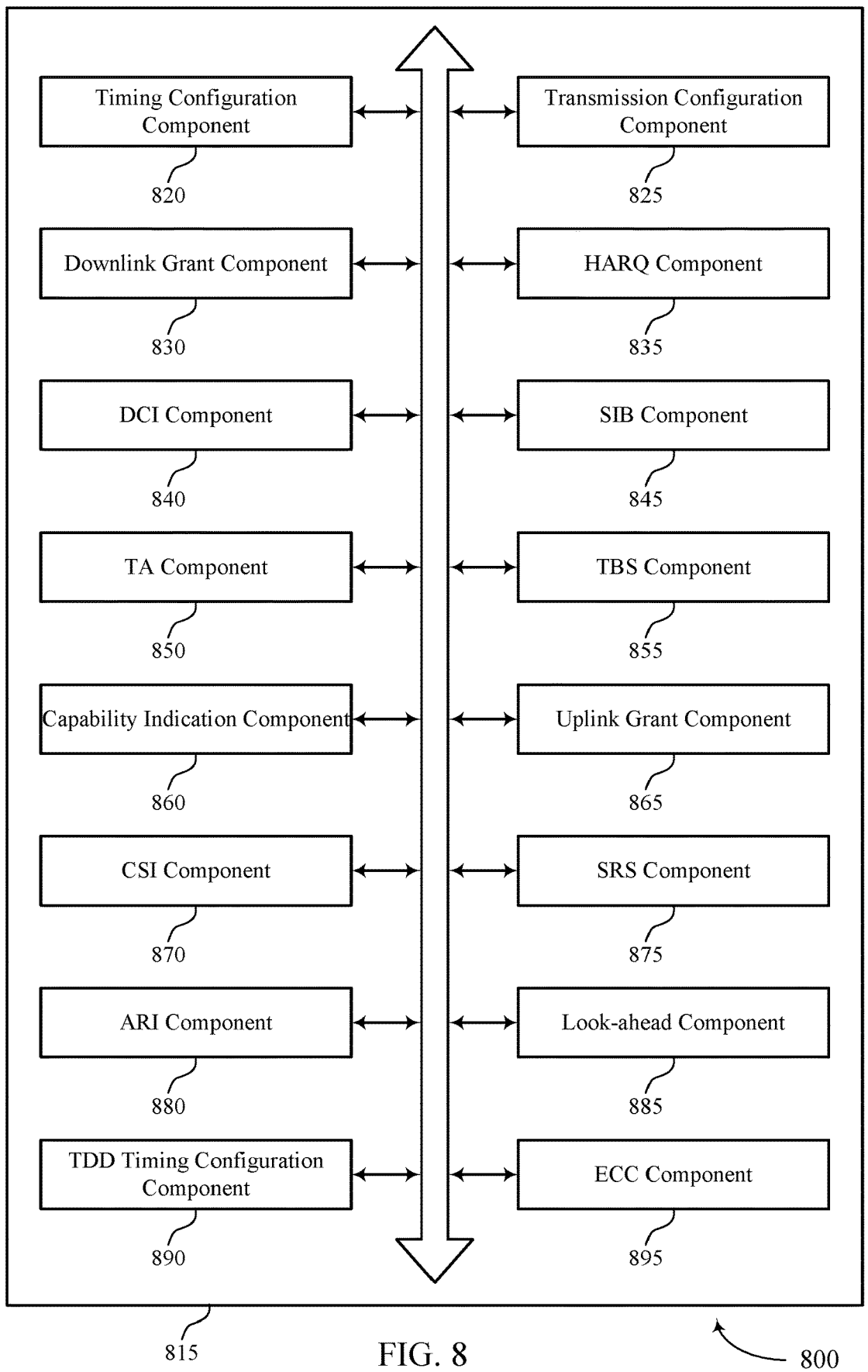

FIG. 8 shows a block diagram 800 of a communications manager 815 that supports latency reduction techniques in wireless communications in accordance with various aspects of the present disclosure. The communications manager 815 may be an example of aspects of a communications manager 615, a communications manager 715, or a communications manager 915 described with reference to FIGS. 6, 7, and 9. The communications manager 815 may include timing configuration component 820, transmission configuration component 825, downlink grant component 830, HARQ component 835, DCI component 840, SIB component 845, TA component 850, TBS component 855, capability indication component 860, uplink grant component 865, CSI component 870, SRS component 875, ARI component 880, look-ahead component 885, TDD timing configuration component 890, and eCC component 895. Each of these modules may communicate, directly or indirectly, with one another (e.g., via one or more buses).

Timing configuration component 820 may determine whether to use a first timing configuration or a second timing configuration transmissions, similarly as discussed for timing configuration component 725 of FIG. 7. In some cases, the timing configuration component 820 may dynamically determining is based on one or more scheduling parameters associated with the downlink communication. In some cases, the downlink communication is transmitted using a set of component carriers, and where determining the first timing configuration includes determining the first timing configuration for a first subset of the set of component carriers, and where determining the second timing configuration includes determining the second timing configuration for a second subset of the set of component carriers. In some cases, the third time difference is less than or equal to the second time difference.

Transmission configuration component 825 may transmit according to the first timing configuration or the second timing configuration based on the determination, transmit according to the first timing configuration responsive to receiving the DCI for the downlink communication in the common search space, and transmit according to the first timing configuration or the second timing configuration based on a format of the DCI. In some cases, the transmitting includes transmitting an uplink data transmission responsive to an uplink grant received from a base station.

Downlink grant component 830 may identify the downlink communication contains an uplink grant and the responsive uplink communication uses resources identified in the downlink communication.

HARQ component 835 may configure reporting of HARQ feedback based on the timing configuration, configure HARQ feedback different subsets of a set of component carriers, and multiplexed HARQ feedback for different subsets of the set of component carriers. In some examples, HARQ component 835 may configure HARQ feedback from a first TDD downlink subframe and/or second TDD downlink subframe to be transmitted in a third TDD uplink subframe based on association rules and/or TDD configuration. In some cases, the downlink communication includes downlink data and the responsive uplink communication provides acknowledgment feedback of successful reception of the downlink data. In some cases, the downlink communication is a physical downlink shared channel (PDSCH) transmission, and where the responsive uplink communication is a transmission of an asynchronous HARQ feedback associated with the PDSCH transmission. In some cases, a first number of HARQ processes associated with the first timing configuration is greater than a second number of HARQ processes associated with the second timing configuration.

DCI component 840 may receive DCI for the downlink communication in a common search space of a downlink control channel, receive downlink control information (DCI) for the downlink communication in a UE-specific search space of a downlink control channel, and identify a location of the DCI. DCI component 840 may, in some examples, receive control information associated with the downlink communication in a control channel that spans an entire subframe (e.g., ePDCCH), receive control information associated with the downlink communication in a control channel that spans a subset of symbols of a subframe (e.g., PDCCH), and identify a location of control channel resources for the responsive uplink communication based on the control information. In some cases, uplink transmissions may be transmitted according to the first timing configuration for a first subset of a set of available DCI formats, and may be transmitted according to the second timing configuration for a second subset of the set of available DCI formats.

SIB component 845 may identify one or more of a SIB transmission, a random access transmission, or a broadcast transmission transmitted to multiple receivers, and transmitting according to the first timing configuration responsive to the determining.

TA component 850 may identify a maximum timing advance (TA) available for the responsive uplink communication, and timing configurations may be based on the maximum TA.

TBS component 855 may identify a maximum transport block size (TBS) available for the responsive uplink communication, and timing configurations may be determined based on the maximum TA and the maximum TBS. In some cases, a maximum transport block size (TBS) available for the second timing configuration is determined based on an indication of the capability of the UE to transmit the responsive uplink communication within the first time difference or the second time difference. In some cases, a maximum transport block size (TBS) available for the second timing configuration is determined based on a number of concurrent transmissions that may be received by the UE.

Capability indication component 860 in cases where communications manager 815 is part of a UE, may provide an indication of the capability of the UE to transmit the responsive uplink communication within the first time difference or the second time difference. Capability indication component 860 in cases where communications manager 815 is part of a base station, may receive, from the UE, an indication of the capability of the UE to transmit the responsive uplink communication within the first time difference or the second time difference.

Uplink grant component 865 may identify that the downlink communication includes an uplink grant that is provided no earlier than a latest subframe associated with acknowledgment receipt feedback to be transmitted using wireless resources identified in the uplink grant. In some cases, the transmitting includes transmitting an uplink grant to the UE.

CSI component 870 may determine that the second timing configuration further includes identifying a periodicity for updating CSI based on the identified second timing configuration and identify the periodicity for updating CSI includes identifying one or more of a number of CSI processes, a CSI report type, or a reference measurement subframe.

SRS component 875 may determine the second timing configuration based on identifying a SRS parameter based on the identified second timing configuration.

ARI component 880 may configure an uplink control channel resource indicator based on the first timing configuration for a downlink communication time interval (TTI) and update the uplink control channel resource indicator based on the second timing configuration for the second TTI.

Look-ahead component 885 may determine that a transmission in a first time interval (TTI) is dependent upon information in a second TTI subsequent to the first TTI.

TDD timing configuration component 890 may determine TDD timing configurations, and HARQ associations.

ECC component 895 may manage communications using shared radio frequency spectrum. In some cases, one or more of the downlink communication or the responsive uplink communication are transmitted using a shared radio frequency spectrum band, and the ECC component may modify one or more of a cross-transmission opportunity scheduling configuration or a number of HARQ feedback processes based on the capability of the UE to transmit the responsive uplink communication within the first time difference or the second time difference.

Figure 9:
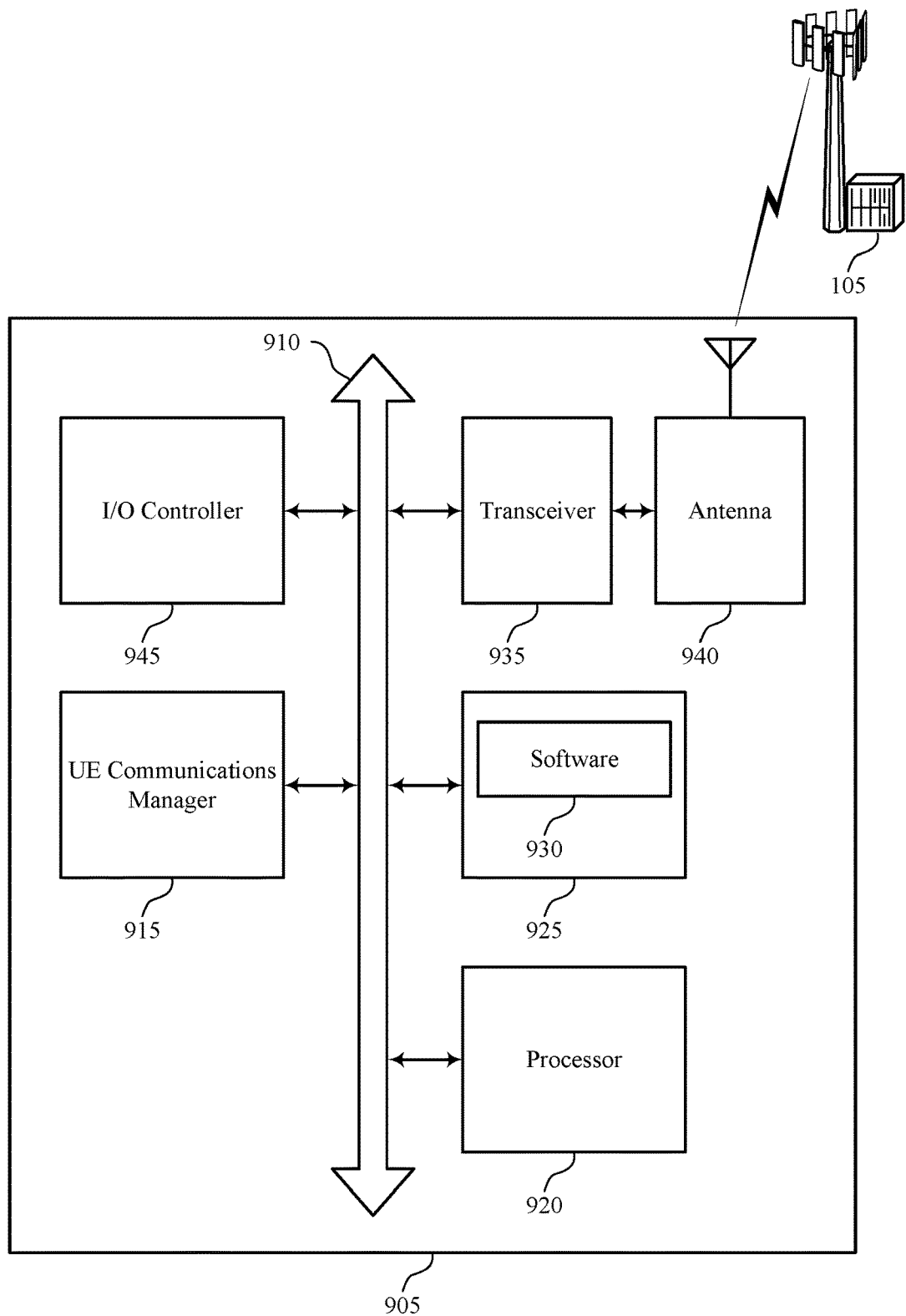
FIG. 9 illustrates a block diagram of a system including a UE that supports latency reduction techniques in wireless communications in accordance with aspects of the present disclosure.

FIG. 9 shows a diagram of a system 900 including a device 905 that supports latency reduction techniques in wireless communications in accordance with various aspects of the present disclosure. Device 905 may be an example of or include the components of wireless device 605, wireless device 705, or a UE 115 as described above, e.g., with reference to FIGS. 1, 6, and 7. Device 905 may include components for bi-directional voice and data communications including components for transmitting and receiving communications, including UE communications manager 915, processor 920, memory 925, software 930, transceiver 935, antenna 940, and I/O controller 945.

Processor 920 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting latency reduction techniques in wireless communications).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a Basic Input-Output system (BIOS) which may control basic hardware and/or software operation such as the interaction with peripheral components or devices.

Software 930 may include code to implement aspects of the present disclosure, including code to support latency reduction techniques in wireless communications. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system.

Figure 10:
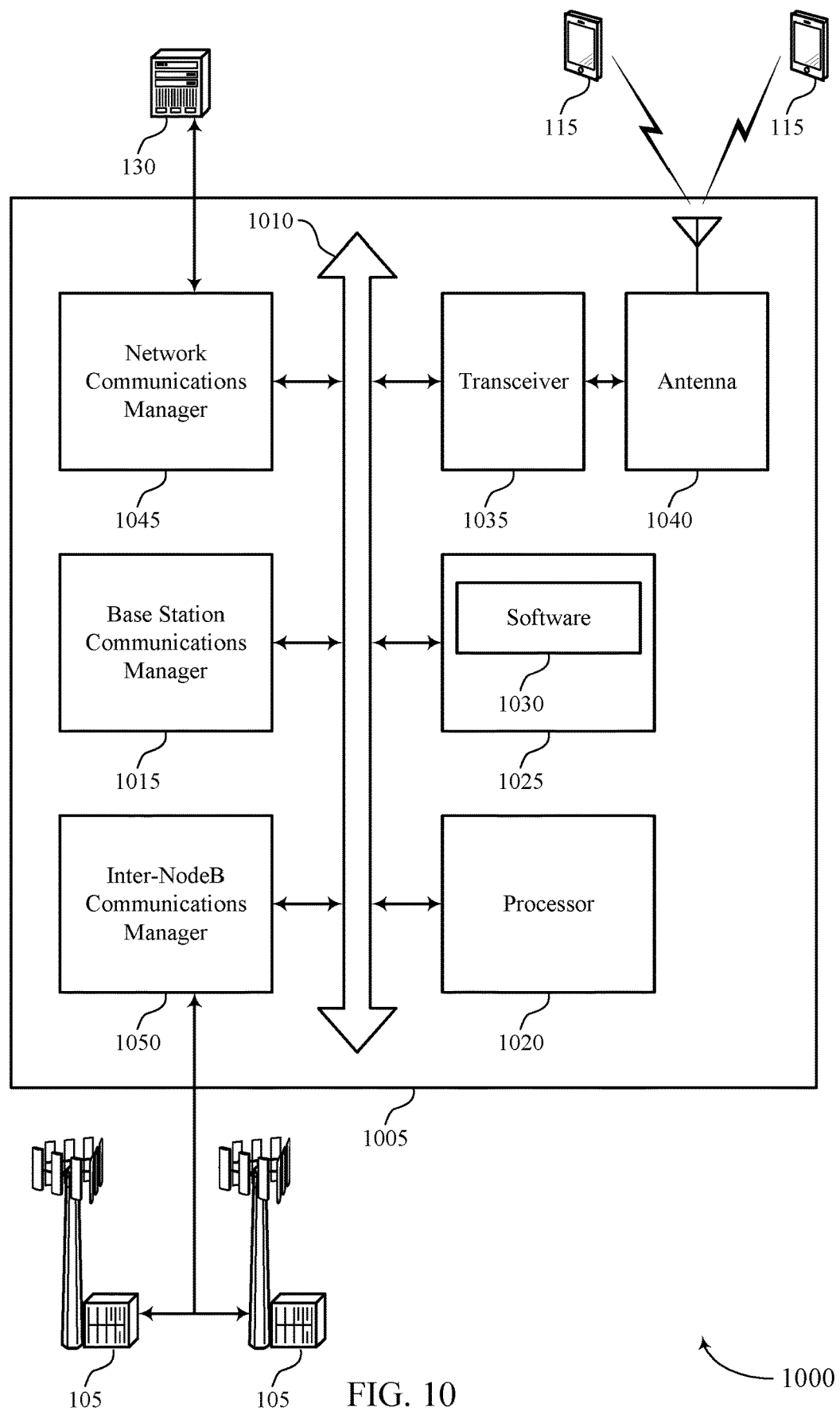
FIG. 10 illustrates a block diagram of a system including a base station that supports latency reduction techniques in wireless communications in accordance with aspects of the present disclosure.

FIG. 10 shows a diagram of a system 1000 including a device 1005 that supports latency reduction techniques in wireless communications in accordance with various aspects of the present disclosure. Device 1005 may be an example of or include the components of wireless device 705, wireless device 805, or a base station 105 as described above, e.g., with reference to FIGS. 1, 7, and 8. Device 1005 may include components for bi-directional voice and data communications including components for transmitting and receiving communications, including base station communications manager 1015, processor 1020, memory 1025, software 1030, transceiver 1035, antenna 1040, network communications manager 1045, and inter-NodeB communications manager 1050.

Base station communications manager 1015 may be an example of aspects of a communications manager 615 or a communications manager 715 described with reference to FIGS. 6 and 7.

Processor 1020 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting latency reduction techniques in wireless communications).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a Basic Input-Output system (BIOS) which may control basic hardware and/or software operation such as the interaction with peripheral components or devices.

Software 1030 may include code to implement aspects of the present disclosure, including code to support latency reduction techniques in wireless communications. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Inter-NodeB communications manager 1050 may manage communications with other base station 105, and may include a controller or scheduler for controlling communications with UEs 115 in cooperation with other base stations 105. For example, the inter-NodeB communications manager 1050 may coordinate scheduling for transmissions to UEs 115 for various interference mitigation techniques such as beamforming or joint transmission. In some examples, inter-NodeB communications manager 1050 may provide an X2 interface within an LTE/LTE-A wireless communication network technology to provide communication between base stations 105.

Figure 11:
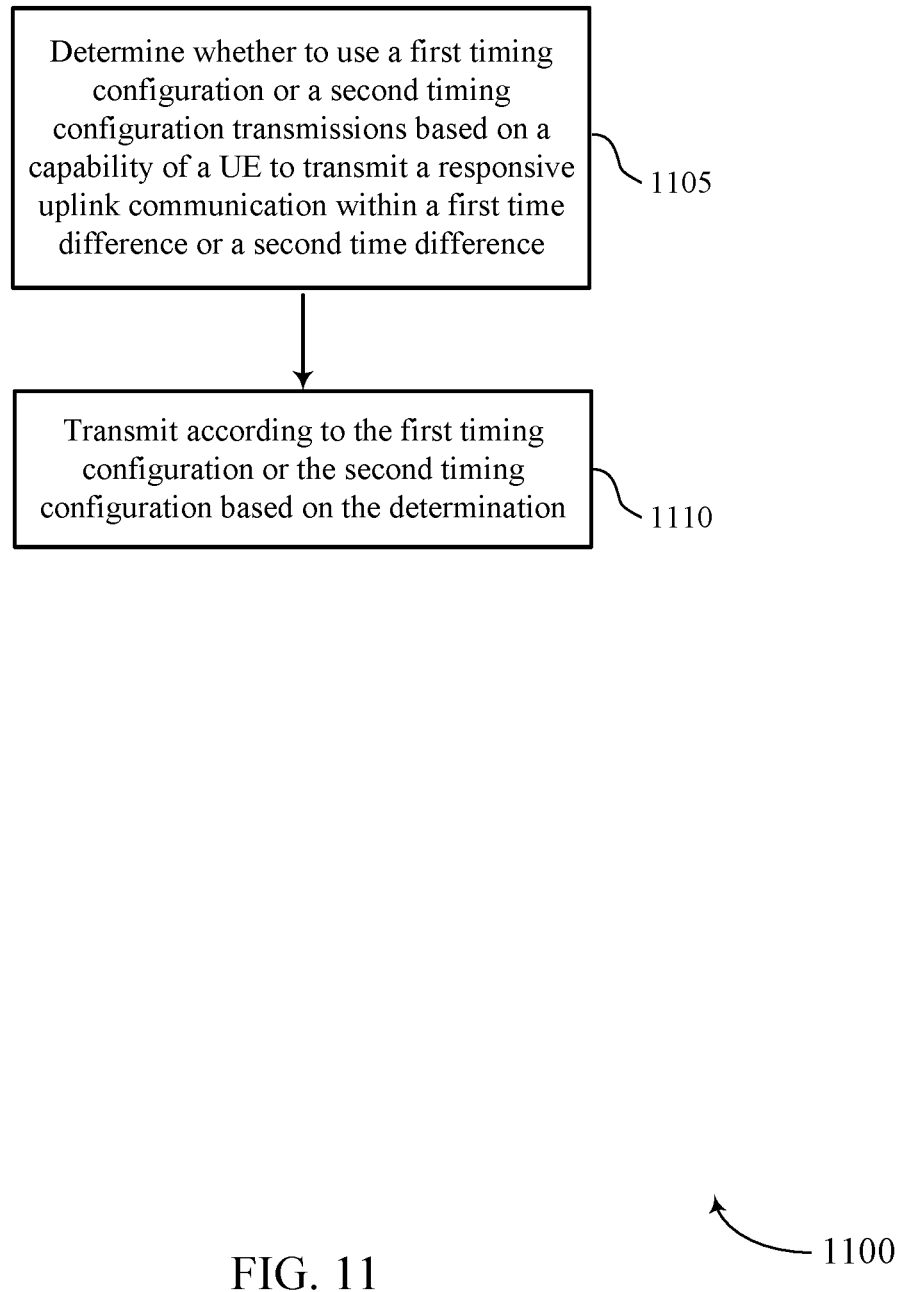
FIGS. 11 through 16 illustrate methods for latency reduction techniques in wireless communications in accordance with aspects of the present disclosure.

FIG. 11 shows a flowchart illustrating a method 1100 for latency reduction techniques in wireless communications in accordance with various aspects of the present disclosure. The operations of method 1100 may be implemented by a UE 115 or base station 105 or its components as described herein. For example, the operations of method 1100 may be performed by a communications manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects the functions described below using special-purpose hardware.

At block 1105 the UE 115 or base station 105 may determine whether to use a first timing configuration or a second timing configuration for transmissions. The first timing configuration may include a first time difference between a downlink communication and a responsive uplink communication, and the second timing configuration include a second time difference between the downlink communication and the responsive uplink communication, the second time difference being less than the first time difference. The determination may be based at least in part on a capability of a user equipment (UE) to transmit the responsive uplink communication within the first time difference or the second time difference. The operations of block 1105 may be performed according to the methods described with reference to FIGS. 1 through 5. In certain examples, aspects of the operations of block 1105 may be performed by a timing configuration component as described with reference to FIGS. 6 through 8.

At block 1110 the UE 115 or base station 105 may transmit according to the first timing configuration or the second timing configuration based on the determination. The operations of block 1110 may be performed according to the methods described with reference to FIGS. 1 through 5. In certain examples, aspects of the operations of block 1110 may be performed by a transmission configuration component as described with reference to FIGS. 6 through 8, which may operate in cooperation with a transmitter 620 or 720 as described with reference to FIG. 6 or 7, or antenna(s) 940 and transceiver(s) 935 as described with reference to FIG. 9, or antenna(s) 1040 and transceiver(s) 1035 as described with reference to FIG. 10.

Figure 12:
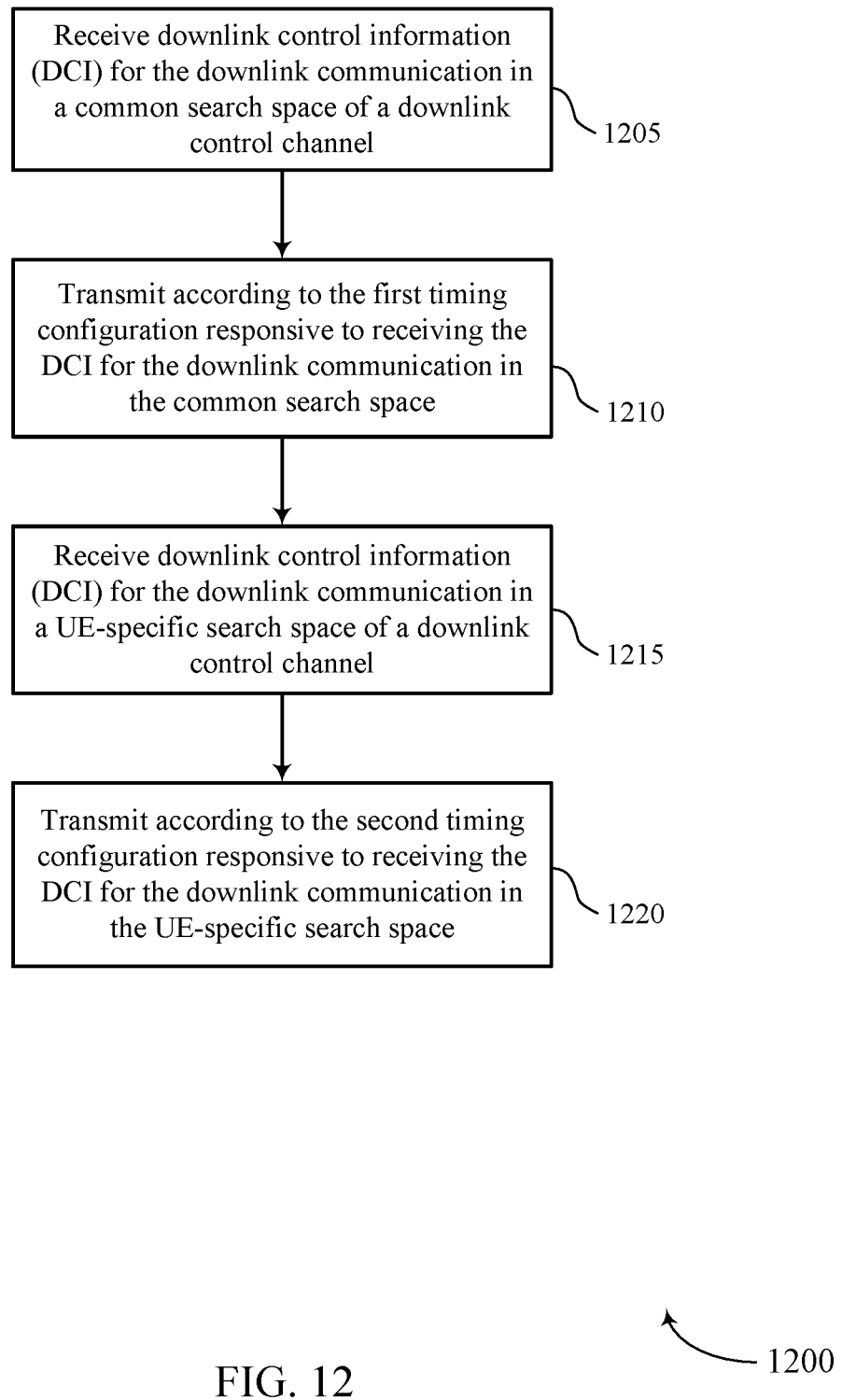

FIG. 12 shows a flowchart illustrating a method 1200 for latency reduction techniques in wireless communications in accordance with various aspects of the present disclosure. The operations of method 1200 may be implemented by a UE 115 or base station 105 or its components as described herein. For example, the operations of method 1200 may be performed by a communications manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects the functions described below using special-purpose hardware. In some examples, a downlink communication may include an uplink grant and the responsive uplink communication may include an uplink data message where the time difference associated with the communication may jointly apply to another downlink communication and another responsive uplink communication based on the determination of the timing configuration to use for the communication, where the other downlink transmission may include a downlink grant and the other responsive uplink transmission may include feedback responsive to the downlink grant.

At block 1205 the UE 115 or base station 105 may receive downlink control information (DCI) for a downlink communication in a common search space of a downlink control channel. The operations of block 1205 may be performed according to the methods described with reference to FIGS. 1 through 5. In certain examples, aspects of the operations of block 1205 may be performed by a DCI component as described with reference to FIGS. 6 through 8, which may operate in cooperation with a receiver 610 or 710 as described with reference to FIG. 6 or 7, or antenna(s) 940 and transceiver(s) 935 as described with reference to FIG. 9, or antenna(s) 1040 and transceiver(s) 1035 as described with reference to FIG. 10.

At block 1210 the UE 115 or base station 105 may transmit according to the first timing configuration responsive to receiving the DCI for the downlink communication in the common search space. The operations of block 1210 may be performed according to the methods described with reference to FIGS. 1 through 5. In certain examples, aspects of the operations of block 1210 may be performed by a transmission configuration component as described with reference to FIGS. 6 through 8, which may operate in cooperation with a transmitter 620 or 720 as described with reference to FIG. 6 or 7, or antenna(s) 940 and transceiver(s) 935 as described with reference to FIG. 9, or antenna(s) 1040 and transceiver(s) 1035 as described with reference to FIG. 10.

At block 1215 the UE 115 or base station 105 may receive downlink control information (DCI) for a downlink communication in a UE-specific search space of a downlink control channel. The operations of block 1215 may be performed according to the methods described with reference to FIGS. 1 through 5. In certain examples, aspects of the operations of block 1215 may be performed by a DCI component as described with reference to FIGS. 6 through 8, which may operate in cooperation with a receiver 610 or 710 as described with reference to FIG. 6 or 7, or antenna(s) 940 and transceiver(s) 935 as described with reference to FIG. 9, or antenna(s) 1040 and transceiver(s) 1035 as described with reference to FIG. 10.

At block 1220 the UE 115 or base station 105 may transmit according to the second timing configuration responsive to receiving the DCI for the downlink communication in the UE-specific search space. The operations of block 1220 may be performed according to the methods described with reference to FIGS. 1 through 5. In certain examples, aspects of the operations of block 1220 may be performed by a timing configuration component as described with reference to FIGS. 6 through 8, which may operate in cooperation with a transmitter 620 or 720 as described with reference to FIG. 6 or 7, or antenna(s) 940 and transceiver(s) 935 as described with reference to FIG. 9, or antenna(s) 1040 and transceiver(s) 1035 as described with reference to FIG. 10.

Figure 13:
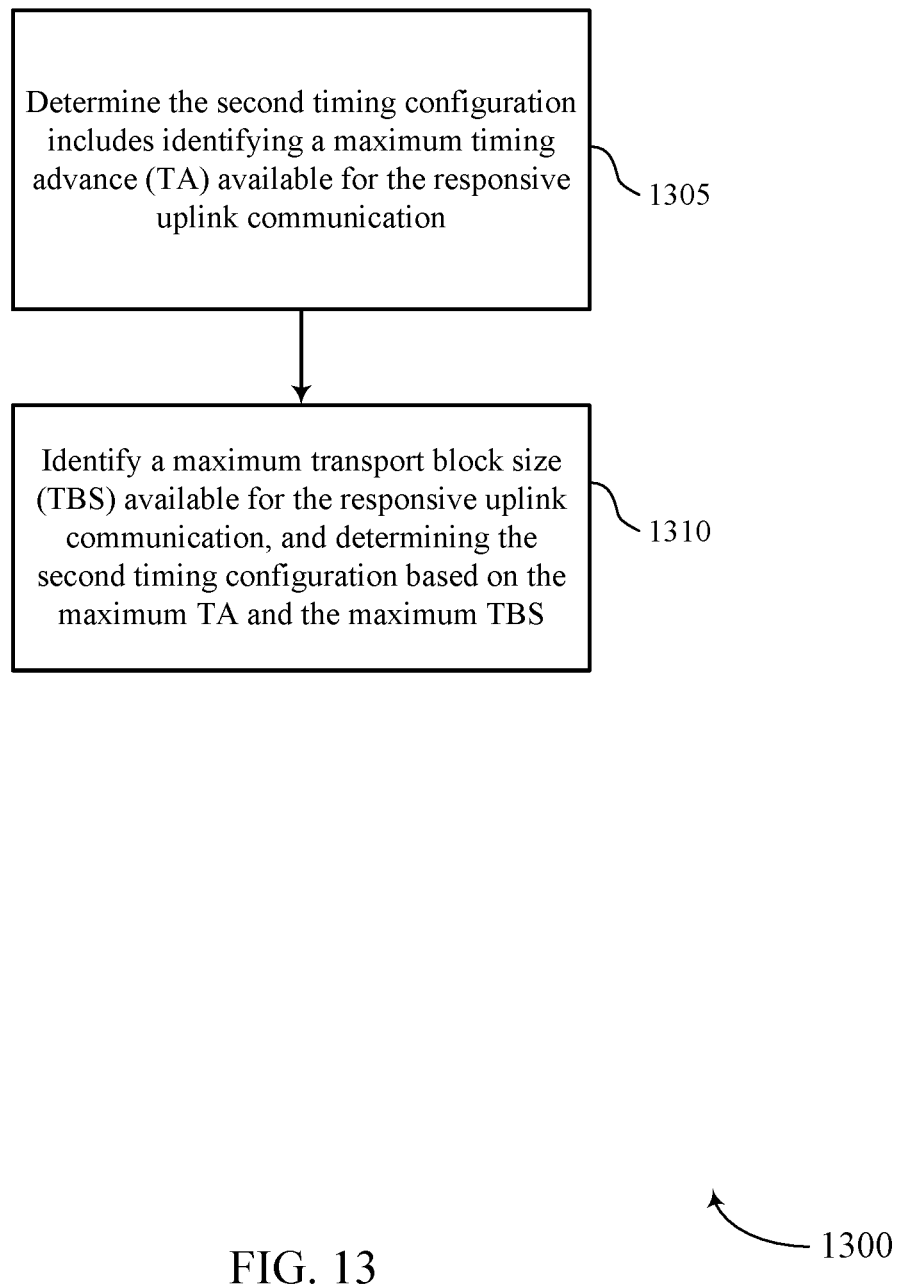

FIG. 13 shows a flowchart illustrating a method 1300 for latency reduction techniques in wireless communications in accordance with various aspects of the present disclosure. The operations of method 1300 may be implemented by a UE 115 or base station 105 or its components as described herein. For example, the operations of method 1300 may be performed by a communications manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects the functions described below using special-purpose hardware.

At block 1305 the UE 115 or base station 105 may determine the second timing configuration comprises identifying a maximum timing advance (TA) available for the responsive uplink communication. The operations of block 1305 may be performed according to the methods described with reference to FIGS. 1 through 5. In certain examples, aspects of the operations of block 1305 may be performed by a TA component as described with reference to FIGS. 6 through 8.

At block 1310 the UE 115 or base station 105 may identify a maximum transport block size (TBS) available for the responsive uplink communication, and determine the second timing configuration based at least in part on the maximum TA and the maximum TBS. The operations of block 1310 may be performed according to the methods described with reference to FIGS. 1 through 5. In certain examples, aspects of the operations of block 1310 may be performed by a TBS component as described with reference to FIGS. 6 through 8.

Figure 14:
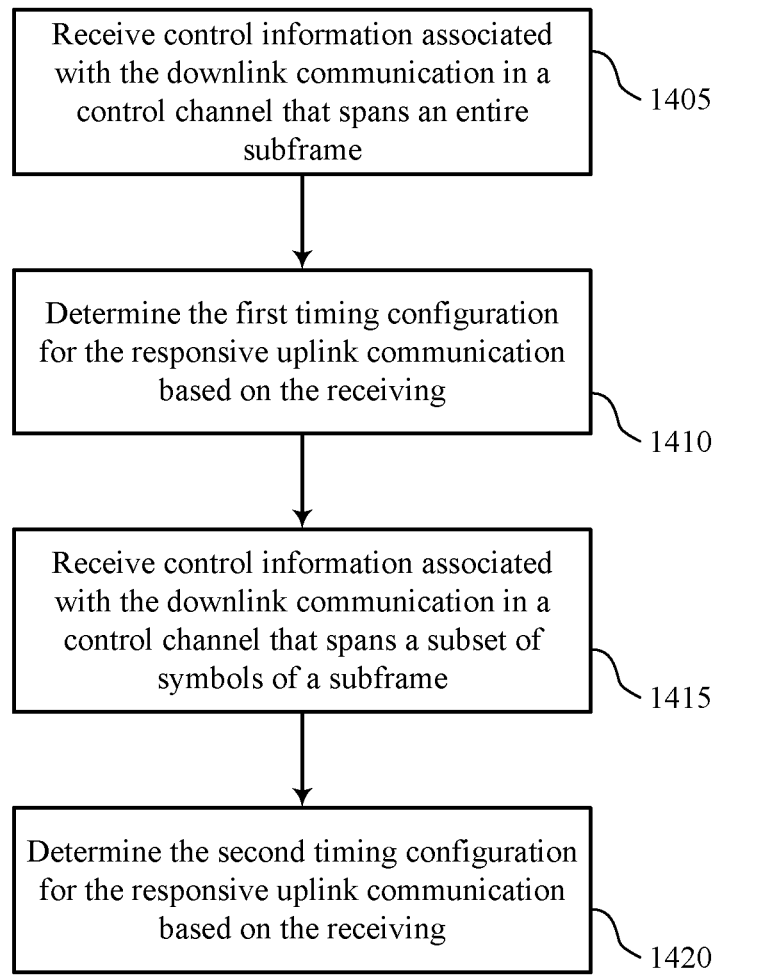

FIG. 14 shows a flowchart illustrating a method 1400 for latency reduction techniques in wireless communications in accordance with various aspects of the present disclosure. The operations of method 1400 may be implemented by a UE 115 or base station 105 or its components as described herein. For example, the operations of method 1400 may be performed by a communications manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects the functions described below using special-purpose hardware.

At block 1405 the UE 115 or base station 105 may receive control information associated with the downlink communication in a control channel that spans an entire subframe. The operations of block 1405 may be performed according to the methods described with reference to FIGS. 1 through 5. In certain examples, aspects of the operations of block 1405 may be performed by a DCI component as described with reference to FIGS. 6 through 8, which may operate in cooperation with a receiver 610 or 710 as described with reference to FIG. 6 or 7, or antenna(s) 940 and transceiver(s) 935 as described with reference to FIG. 9, or antenna(s) 1040 and transceiver(s) 1035 as described with reference to FIG. 10.

At block 1410 the UE 115 or base station 105 may determine the first timing configuration for the responsive uplink communication based at least in part on the receiving. The operations of block 1410 may be performed according to the methods described with reference to FIGS. 1 through 5. In certain examples, aspects of the operations of block 1410 may be performed by a timing configuration component as described with reference to FIGS. 6 through 8.

At block 1415 the UE 115 or base station 105 may receive control information associated with the downlink communication in a control channel that spans a subset of symbols of a subframe. The operations of block 1415 may be performed according to the methods described with reference to FIGS. 1 through 5. In certain examples, aspects of the operations of block 1415 may be performed by a DCI component as described with reference to FIGS. 6 through 8, which may operate in cooperation with a receiver 610 or 710 as described with reference to FIG. 6 or 7, or antenna(s) 940 and transceiver(s) 935 as described with reference to FIG. 9, or antenna(s) 1040 and transceiver(s) 1035 as described with reference to FIG. 10.

At block 1420 the UE 115 or base station 105 may determine the second timing configuration for the responsive uplink communication based at least in part on the receiving. The operations of block 1420 may be performed according to the methods described with reference to FIGS. 1 through 5. In certain examples, aspects of the operations of block 1420 may be performed by a timing configuration component as described with reference to FIGS. 6 through 8.

Figure 15:
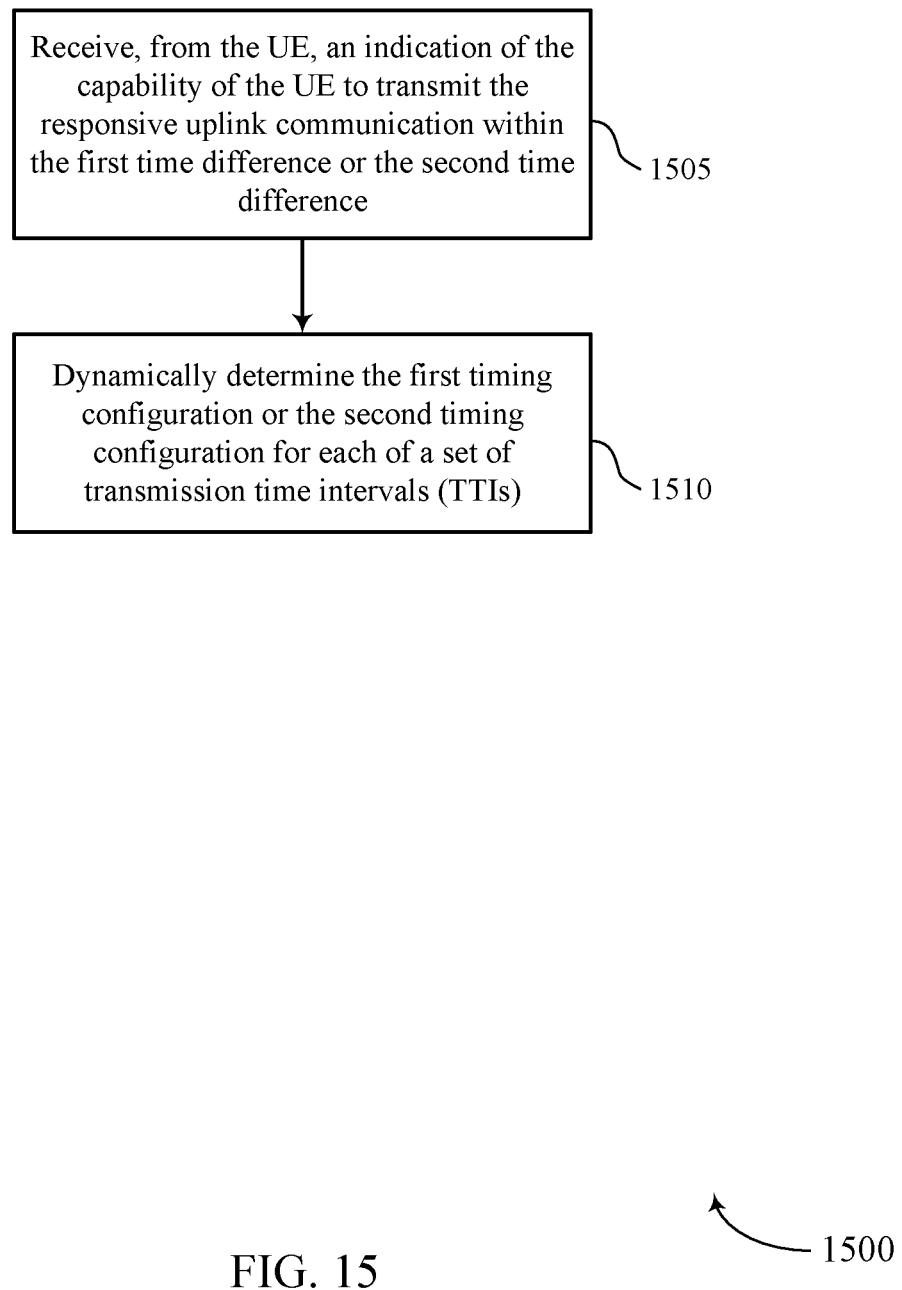

FIG. 15 shows a flowchart illustrating a method 1500 for latency reduction techniques in wireless communications in accordance with various aspects of the present disclosure. The operations of method 1500 may be implemented by a base station 105 or its components as described herein. For example, the operations of method 1500 may be performed by a communications manager as described with reference to FIGS. 6 through 8. In some examples, base station 105 may execute a set of codes to control the functional elements of the device to perform the functions described below. Additionally or alternatively, the base station 105 may perform aspects the functions described below using special-purpose hardware. In some examples, UE may receive RRC signaling that indicates a timing configuration and determine the timing configuration for each transmission based on the RRC signaling.

At block 1505 the base station 105 may receive, from the UE, an indication of the capability of the UE to transmit the responsive uplink communication within the first time difference or the second time difference. The operations of block 1505 may be performed according to the methods described with reference to FIGS. 1 through 5. In certain examples, aspects of the operations of block 1505 may be performed by a capability indication component as described with reference to FIGS. 6 through 8, which may operate in cooperation with a receiver 610 or 710 as described with reference to FIG. 6 or 7, or antenna(s) 940 and transceiver(s) 935 as described with reference to FIG. 9, or antenna(s) 1040 and transceiver(s) 1035 as described with reference to FIG. 10.

At block 1510 the base station 105 may dynamically determine the first timing configuration or the second timing configuration for each of a plurality of transmission time intervals (TTIs). The operations of block 1510 may be performed according to the methods described with reference to FIGS. 1 through 5. In certain examples, aspects of the operations of block 1510 may be performed by a timing configuration component as described with reference to FIGS. 6 through 8.

Figure 16:
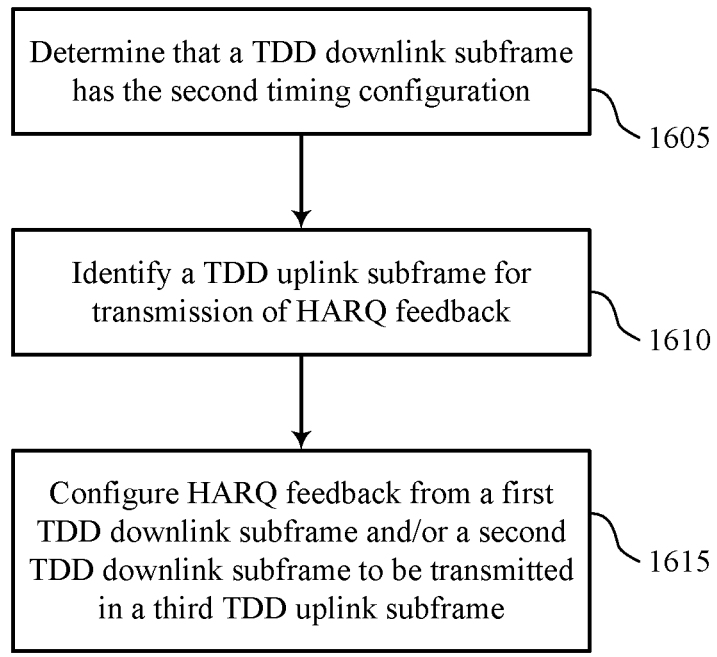

FIG. 16 shows a flowchart illustrating a method 1600 for latency reduction techniques in wireless communications in accordance with various aspects of the present disclosure. The operations of method 1600 may be implemented by a UE 115 or base station 105 or its components as described herein. For example, the operations of method 1600 may be performed by a communications manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects the functions described below using special-purpose hardware.

At block 1605 the UE 115 or base station 105 may determine that a TDD downlink subframe has the second timing configuration. The operations of block 1605 may be performed according to the methods described with reference to FIGS. 1 through 5. In certain examples, aspects of the operations of block 1605 may be performed by a TDD timing configuration component as described with reference to FIGS. 6 through 8.

At block 1610 the UE 115 or base station 105 may identify a TDD uplink subframe for transmission of hybrid automatic repeat request (HARQ) feedback. The operations of block 1610 may be performed according to the methods described with reference to FIGS. 1 through 5. In certain examples, aspects of the operations of block 1610 may be performed by a HARQ component as described with reference to FIGS. 6 through 8.

At block 1615 the UE 115 or base station 105 may configure HARQ feedback from a first TDD downlink subframe and/or a second TDD downlink subframe to be transmitted in a third TDD uplink subframe. The operations of block 1615 may be performed according to the methods described with reference to FIGS. 1 through 5. In certain examples, aspects of the operations of block 1615 may be performed by a HARQ component as described with reference to FIGS. 6 through 8.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," "component," and the like may not be a substitute for the word "means." As such, no claim element is to be construed as a means plus function unless the element is expressly recited using the phrase "means for."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a network entity, in a system comprising:
   one or more processors; and
   instructions stored in one or more memories and executable by the one or more processors, individually or collectively, to cause the apparatus to:
   receive an indication of a user equipment (UE) capability from a UE;
   transmit a timing configuration to the UE based at least in part on the UE capability, the timing configuration comprising either a first timing configuration or a second timing configuration for communications with the UE, the first timing configuration including a first time difference between a downlink communication and a responsive uplink communication, the downlink communication being a physical downlink control channel (PDCCH) transmission, the responsive uplink communication being one or more sounding reference signal (SRS) transmissions, and the second timing configuration including a second time difference between the downlink communication and the responsive uplink communication, the second time difference being less than the first time difference; and receive a responsive uplink communication from the UE according to either the first timing configuration or the second timing configuration.

2. The apparatus of claim 1, wherein the instructions to transmit the timing configuration, when executed by the one or more processors, further cause the apparatus to:

transmit the downlink communication as a downlink control information (DCI) message triggering the one or more SRS transmissions.

3. The apparatus of claim 2, wherein the instructions to transmit the timing configuration, when executed by the one or more processors, further cause the apparatus to:

transmit, via the DCI message, one or more SRS parameters that correspond to either the first timing configuration or the second timing configuration, wherein the one or more SRS parameters corresponding to the first timing configuration are different from the one or more SRS parameters corresponding to the second timing configuration.

4. The apparatus of claim 3, wherein the instructions to transmit the timing configuration, when executed by the one or more processors, further cause the apparatus to:

transmit, as one of the one or more SRS parameters, an indication of a symbol to be used for the one or more SRS transmissions.

5. The apparatus of claim 2, wherein the instructions to transmit the timing configuration, when executed by the one or more processors, further cause the apparatus to:

transmit, via the DCI message, a grant for a physical uplink shared channel (PUSCH) transmission.

6. The apparatus of claim 1, wherein the downlink communication contains an uplink grant and the responsive uplink communication uses resources identified in the uplink grant.

7. The apparatus of claim 1, wherein the instructions, when executed by the one or more processors, further cause the apparatus to:

transmit downlink control information (DCI) for the downlink communication; and wherein transmitting according to the first timing configuration or the second timing configuration is further based at least in part on a format of the DCI.

8. The apparatus of claim 7, wherein the instructions to receive the responsive uplink communication, when executed by the one or more processors, further cause the apparatus to:

receive according to the first timing configuration for a first subset of a set of available DCI formats; and receive according to a third timing configuration for a second subset of the set of available DCI formats.

9. The apparatus of claim 1, wherein the timing configuration comprises a maximum timing advance (TA) available for the responsive uplink communication, and wherein usage of the first timing configuration or the second timing configuration is based at least in part on the maximum TA.

10. The apparatus of claim 1, wherein the timing configuration comprises identifying a maximum transport block size (TBS) available for the responsive uplink communication, and wherein usage of the first timing configuration or the second timing configuration is based at least in part on the maximum TBS.

11. The apparatus of claim 1, wherein the instructions, when executed by the one or more processors, further cause the apparatus to:

transmit control information associated with the downlink communication in a control channel that spans an entire subframe, wherein usage of the first timing configuration is based at least in part on transmitting the control information.

12. The apparatus of claim 1, wherein a maximum transport block size (TBS) available for either the first timing configuration or the second timing configuration is determined based at least in part on an indication of a capability of the UE to transmit the responsive uplink communication.

13. The apparatus of claim 1, wherein a maximum transport block size (TBS) available for either the first timing configuration or the second timing configuration is determined based at least in part on a number of concurrent transmissions that may be received by the UE.

14. The apparatus of claim 1, wherein the instructions, when executed by the one or more processors, further cause the apparatus to:

transmit radio resource control (RRC) signaling that indicates the first timing configuration or the second timing configuration.

15. The apparatus of claim 1, wherein the downlink communication is transmitted using a set of component carriers, and wherein the first timing configuration is associated with a first subset of the set of component carriers and the second timing configuration is associated with a second subset of the set of component carriers.

16. The apparatus of claim 1, wherein the UE capability includes a capability of the UE to transmit the responsive uplink communication within the first time difference or the second time difference.

17. A method for wireless communication, performed by a network entity, comprising:

receiving an indication of a user equipment (UE) capability from a UE;

transmitting a timing configuration to the UE based at least in part on the UE capability, the timing configuration comprising either a first timing configuration or a second timing configuration for communications with the UE, the first timing configuration including a first time difference between a downlink communication and a responsive uplink communication, the downlink communication being a physical downlink control channel (PDCCH) transmission, the responsive uplink communication being one or more sounding reference signal (SRS) transmissions, and the second timing configuration including a second time difference between the downlink communication and the responsive uplink communication, the second time difference being less than the first time difference; and receiving a responsive uplink communication from the UE according to either the first timing configuration or the second timing configuration.

18. The method of claim 17, wherein transmitting the timing configuration further comprises:

transmitting the downlink communication as a downlink control information (DCI) message triggering the one or more SRS transmissions.

19. The method of claim 18, wherein transmitting the timing configuration further comprises:

transmitting, via the DCI message, one or more SRS parameters that correspond to either the first timing configuration or the second timing configuration, wherein the one or more SRS parameters corresponding to the first timing configuration are different from the one or more SRS parameters corresponding to the second timing configuration.

20. The method of claim 19, wherein transmitting the timing configuration further comprises:
transmitting, as one of the one or more SRS parameters, an indication of a symbol to be used for the one or more SRS transmissions.

21. The method of claim 18, wherein transmitting the timing configuration further comprises:
transmitting, via the DCI message, a grant for a physical uplink shared channel (PUSCH) transmission.

22. The method of claim 17, wherein the downlink communication contains an uplink grant and the responsive uplink communication uses resources identified in the uplink grant.

23. The method of claim 17, further comprising:
transmitting downlink control information (DCI) for the downlink communication; and
wherein transmitting according to the first timing configuration or the second timing configuration is further based at least in part on a format of the DCI.

24. The method of claim 23, wherein receiving the responsive uplink communication further comprises:
receiving according to the first timing configuration for a first subset of a set of available DCI formats; and
receiving according to a third timing configuration for a second subset of the set of available DCI formats.

25. The method of claim 17, wherein the timing configuration comprises a maximum timing advance (TA) available for the responsive uplink communication, and wherein usage of the first timing configuration or the second timing configuration is based at least in part on the maximum TA.

26. The method of claim 17, wherein the timing configuration comprises identifying a maximum transport block size (TBS) available for the responsive uplink communication, and wherein usage of the first timing configuration or the second timing configuration is based at least in part on the maximum TBS.

27. The method of claim 17, further comprising:
transmitting control information associated with the downlink communication in a control channel that spans an entire subframe, wherein usage of the first timing configuration is based at least in part on transmitting the control information.

28. The method of claim 17, wherein a maximum transport block size (TBS) available for either the first timing configuration or the second timing configuration is determined based at least in part on an indication of a capability of the UE to transmit the responsive uplink communication.

29. The method of claim 17, wherein a maximum transport block size (TBS) available for either the first timing configuration or the second timing configuration is determined based at least in part on a number of concurrent transmissions that may be received by the UE.

30. The method of claim 17, further comprising:
transmitting radio resource control (RRC) signaling that indicates the first timing configuration or the second timing configuration.

31. The method of claim 17, wherein the downlink communication is transmitted using a set of component carriers, and wherein the first timing configuration is associated with a first subset of the set of component carriers and the second timing configuration is associated with a second subset of the set of component carriers.

32. The method of claim 17, wherein the UE capability includes a capability of the UE to transmit the responsive uplink communication within the first time difference or the second time difference.

33. An apparatus for wireless communication at a network entity, in a system comprising:
one or more processors; and
instructions stored in one or more memories and executable by the one or more processors, individually or collectively, to cause the apparatus to:
transmit a downlink control information (DCI) message triggering one or more sounding reference signal (SRS) transmissions; and
receive the one or more SRS transmissions at one of a first offset or a second offset from the DCI message, the first offset being associated with a first SRS parameter set, and the second offset being associated with a second SRS parameter set.

34. The apparatus of claim 33, wherein each of the first SRS parameter set and the second SRS parameter set indicating an SRS symbol.

35. A method for wireless communication, performed by a network entity, comprising:
transmitting a downlink control information (DCI) message triggering one or more sounding reference signal (SRS) transmissions; and
receiving the one or more SRS transmissions at one of a first offset or a second offset from the DCI message, the first offset being associated with a first SRS parameter set, and the second offset being associated with a second SRS parameter set.

36. The method of claim 35, wherein each of the first SRS parameter set and the second SRS parameter set indicating an SRS symbol.

37. An apparatus for wireless communication at a network entity, in a system comprising:
one or more processors; and
instructions stored in one or more memories and executable by the one or more processors, individually or collectively, to cause the apparatus to:
transmit a downlink control information (DCI) message triggering a physical uplink shared channel (PUSCH) transmission and a sounding reference signal (SRS) transmission; and
receive the PUSCH transmission at a first offset from the DCI message and the SRS transmission at a second offset from the DCI message.

38. A method for wireless communication, performed by a network entity, comprising:
transmitting a downlink control information (DCI) message triggering a physical uplink shared channel (PUSCH) transmission and a sounding reference signal (SRS) transmission; and
receiving the PUSCH transmission at a first offset from the DCI message and the SRS transmission at a second offset from the DCI message.

39. An apparatus for wireless communication at a network entity, in a system comprising:
one or more processors; and
instructions stored in one or more memories and executable by the one or more processors, individually or collectively, to cause the apparatus to:
receive an indication of a user equipment (UE) capability from a UE;
transmit a timing configuration to the UE based at least in part on the UE capability, the timing configuration comprising either a first timing configuration or a second timing configuration for communications with the UE, the first timing configuration including a first time difference between a downlink communication and a responsive uplink communication, the downlink communication being a physical downlink shared channel (PDSCH) transmission, the responsive uplink communication being a physical uplink control channel (PUCCH) transmission, and the second timing configuration including a second time difference between the downlink communication and the responsive uplink communication, the second time difference being less than the first time difference; and receive a responsive uplink communication from the UE according to either the first timing configuration or the second timing configuration.

40. The apparatus of claim 39, wherein the downlink communication includes downlink data and the responsive uplink communication provides acknowledgment feedback of successful reception of the downlink data.

41. The apparatus of claim 39, wherein the instructions, when executed by the one or more processors, further cause the apparatus to:

transmit downlink control information (DCI) for the downlink communication, wherein the responsive uplink communication is according to either the first timing configuration or the second timing configuration based at least in part on a format of the DCI.

42. The apparatus of claim 41, wherein the instructions to cause the apparatus to receive the responsive uplink communication, when executed by the one or more processors, further cause the apparatus to:

receive the responsive uplink communication in accordance with the first timing configuration and a first subset of a set of available DCI formats; and receive the responsive uplink communication in accordance with the second timing configuration and a second subset of the set of available DCI formats.

43. The apparatus of claim 39, wherein the instructions, when executed by the one or more processors, further cause the apparatus to:

transmit radio resource control (RRC) signaling that indicates the first timing configuration or the second timing configuration.

44. The apparatus of claim 39, wherein the responsive uplink communication is a transmission of a hybrid automatic repeat request (HARQ) feedback associated with the PDSCH transmission.

45. The apparatus of claim 44, wherein a first number of HARQ processes associated with the first timing configuration is greater than a second number of HARQ processes associated with the second timing configuration.

46. A method for wireless communication at a network entity, in a system comprising:

receiving an indication of a user equipment (UE) capability from a UE;

transmitting a timing configuration to the UE based at least in part on the UE capability, the timing configuration comprising either a first timing configuration or a second timing configuration for communications with the UE, the first timing configuration including a first time difference between a downlink communication and a responsive uplink communication, the downlink communication being a physical downlink shared channel (PDSCH) transmission, the responsive uplink communication being a physical uplink control channel (PUCCH) transmission, and the second timing configuration including a second time difference between the downlink communication and the responsive uplink communication, the second time difference being less than the first time difference; and receiving a responsive uplink communication from the UE according to either the first timing configuration or the second timing configuration.

47. The method of claim 46, wherein the downlink communication includes downlink data and the responsive uplink communication provides acknowledgment feedback of successful reception of the downlink data.

48. The method of claim 46, further comprising:

transmitting downlink control information (DCI) for the downlink communication, wherein the responsive uplink communication is according to either the first timing configuration or the second timing configuration based at least in part on a format of the DCI.

49. The method of claim 48, wherein receiving the responsive uplink communication further comprises:

receiving the responsive uplink communication in accordance with the first timing configuration and a first subset of a set of available DCI formats; and receiving the responsive uplink communication in accordance with the second timing configuration and a second subset of the set of available DCI formats.

50. The method of claim 46, further comprising:

transmitting radio resource control (RRC) signaling that indicates the first timing configuration or the second timing configuration.

51. The method of claim 46, wherein the responsive uplink communication is a transmission of a hybrid automatic repeat request (HARQ) feedback associated with the PDSCH transmission.

52. The method of claim 51, wherein a first number of HARQ processes associated with the first timing configuration is greater than a second number of HARQ processes associated with the second timing configuration.

* * * * *